(12) United States Patent
Roskind et al.

(10) Patent No.: US 9,450,754 B2
(45) Date of Patent: Sep. 20, 2016

(54) DATA PRIVACY

(71) Applicants: James A. Roskind, Redwood City, CA (US); Aaron T. Emigh, Incline Village, NV (US)

(72) Inventors: James A. Roskind, Redwood City, CA (US); Aaron T. Emigh, Incline Village, NV (US)

(73) Assignee: James A. Roskind, Redwood City, CA (US)

( * ) Notice: Subject to any disclaimer, the term of this patent is extended or adjusted under 35 U.S.C. 154(b) by 0 days.

(21) Appl. No.: 13/783,011

(22) Filed: Mar. 1, 2013

(65) Prior Publication Data

US 2013/0243188 A1    Sep. 19, 2013

Related U.S. Application Data

(63) Continuation of application No. 11/178,161, filed on Jul. 8, 2005, now Pat. No. 8,412,837.

(60) Provisional application No. 60/586,249, filed on Jul. 8, 2004, provisional application No. 60/612,132, filed on Sep. 22, 2004.

(51) Int. Cl.
    *H04L 9/30*    (2006.01)
    *H04L 29/06*   (2006.01)
    *G06F 21/62*   (2013.01)

(52) U.S. Cl.
    CPC ............. *H04L 9/30* (2013.01); *G06F 21/6209* (2013.01); *H04L 63/0442* (2013.01); *H04L 63/1483* (2013.01)

(58) Field of Classification Search
    None
    See application file for complete search history.

(56) References Cited

U.S. PATENT DOCUMENTS

5,978,918 A    11/1999  Scholnick et al.
7,100,049 B2    8/2006  Gasparini et al.

(Continued)

OTHER PUBLICATIONS

Non-Final Office Action mailed May 14, 2014 in U.S. Appl. No. 13/743,220.

(Continued)

*Primary Examiner* — Saleh Najjar
*Assistant Examiner* — Simon Kanaan
(74) *Attorney, Agent, or Firm* — Mahamedi IP Law LLP

(57) ABSTRACT

In some embodiments, techniques for data security may include encoding and decoding unreadably encoded data, such as data encrypted with a public key or tokenized. In some embodiments, techniques for data security may include distributing an encrypted private key. In some embodiments, unreadable data may be encrypted and/or decrypted using time-varying keys.

In some embodiments, techniques for data security may include combining information and a policy, and encoding the combined information and policy, wherein encrypting the combined information and policy is performed using a public key, or via tokenization.

In some embodiments, techniques for data security may include receiving data, wherein the data has been encoded, decoding the data, determining a first datum and a second datum, wherein the first datum and the second datum are associated with the decoded data, and determining a policy, wherein the policy is associated with the first datum.

20 Claims, 41 Drawing Sheets

(56) References Cited

U.S. PATENT DOCUMENTS

| | | |
|---|---|---|
| 7,107,247 B2 | 9/2006 | Kinoshita et al. |
| 7,158,657 B2 | 1/2007 | Okazaki et al. |
| 7,395,241 B1 | 7/2008 | Cook et al. |
| 7,451,487 B2 | 11/2008 | Oliver et al. |
| 7,676,546 B2 | 3/2010 | Hallam-Baker |
| 7,870,078 B2 | 1/2011 | Clark et al. |
| 7,971,246 B1 | 6/2011 | Emigh et al. |
| 8,205,249 B2 | 6/2012 | Meister |
| 8,423,471 B1 | 4/2013 | Emigh et al. |
| 8,561,167 B2 | 10/2013 | Alperovitch et al. |
| 8,943,588 B1 | 1/2015 | Speegle et al. |
| 2003/0101072 A1* | 5/2003 | Dick et al. ............ 705/1 |
| 2003/0196114 A1* | 10/2003 | Brew et al. ............ 713/201 |
| 2004/0205135 A1 | 10/2004 | Hallam-Baker |
| 2005/0076221 A1 | 4/2005 | Olkin et al. |
| 2005/0076222 A1 | 4/2005 | Olkin et al. |
| 2005/0268100 A1 | 12/2005 | Gasparini et al. |
| 2006/0123478 A1 | 6/2006 | Rehfuss et al. |
| 2007/0039038 A1 | 2/2007 | Goodman et al. |
| 2007/0044149 A1 | 2/2007 | Xavier et al. |
| 2007/0101423 A1 | 5/2007 | Oliver et al. |
| 2007/0245422 A1 | 10/2007 | Hwang et al. |
| 2009/0064330 A1 | 3/2009 | Shraim et al. |
| 2009/0089426 A1 | 4/2009 | Yamasaki et al. |
| 2010/0154058 A1 | 6/2010 | Kay |
| 2010/0306836 A1 | 12/2010 | Hallam-Baker |
| 2010/0306845 A1 | 12/2010 | Vaithilingam et al. |
| 2011/0191851 A1 | 8/2011 | Largman et al. |
| 2011/0247070 A1 | 10/2011 | Xavier et al. |
| 2013/0031628 A1 | 1/2013 | Wang et al. |

OTHER PUBLICATIONS

Final Office Action mailed Jun. 30, 2009 in U.S. Appl. No. 11/116,781, 9 pages.
Non-Final Office Action mailed Sep. 18, 2008 in U.S. Appl. No. 11/116,781, 8 pages.
Non-Final Office Action mailed Oct. 1, 2010 in U.S. Appl. No. 11/178,161, 9 pages.
Notice of Allowance mailed Feb. 17, 2011 in U.S. Appl. No. 11/116,781, 9 pages.
Final Office Action mailed May 20, 2011 in U.S. Appl. No. 11/178,161, 11 pages.
Final Office Action mailed Oct. 7, 2010 in U.S. Appl. No. 11/116,781, 13 pages.
Non-Final Office Action mailed Mar. 31, 2010 in U.S. Appl. No. 11/116,781, 11 pages.
Non-Final Office Action mailed Jun. 4, 2012 in U.S. Appl. No. 11/178,161, 8 pages.
Final Office Action mailed Jan. 21, 2010 in U.S. Appl. No. 11/178,161, 9 pages.
Non-Final Office Action mailed Mar. 30, 2009 in U.S. Appl. No. 11/178,161, 10 pages.
Notice of Allowance mailed Oct. 12, 2012 in U.S. Appl. No. 13/112,810, 12 pages.
Non-Final Office Action mailed Apr. 13, 2012 in U.S. Appl. No. 13/112,810, 8 pages.
Notice of Allowance mailed Dec. 4, 2012 in U.S. Appl. No. 11/178,161, 10 pages.

* cited by examiner

DATA PRIVACY

CROSS REFERENCE TO RELATED APPLICATIONS

This application is a Continuation of U.S. patent application Ser. No. 11/178,161, filed Jul. 8, 2005, which claims benefit of priority to U.S. Provisional Patent Application No. 60/586,249, filed Jul. 8, 2004, and to U.S. Provisional Patent Application No. 60/612,132, filed Sep. 22, 2004; all of the aforementioned priority applications are hereby incorporated by reference in their entirety for all purposes.

FIELD OF THE INVENTION

The present invention relates generally to the area of data security. More specifically, techniques for preserving the privacy of data are disclosed.

BACKGROUND OF THE INVENTION

Sensitive data, including credentials such as credit card numbers, debit card numbers and bank account numbers, and personally identifying information such as social security numbers, names and address data, may be used in unauthorized ways.

Current approaches to data security do not adequately protect data from unauthorized access or use.

Accordingly, it would be useful to be able to safeguard data against unauthorized access and use.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
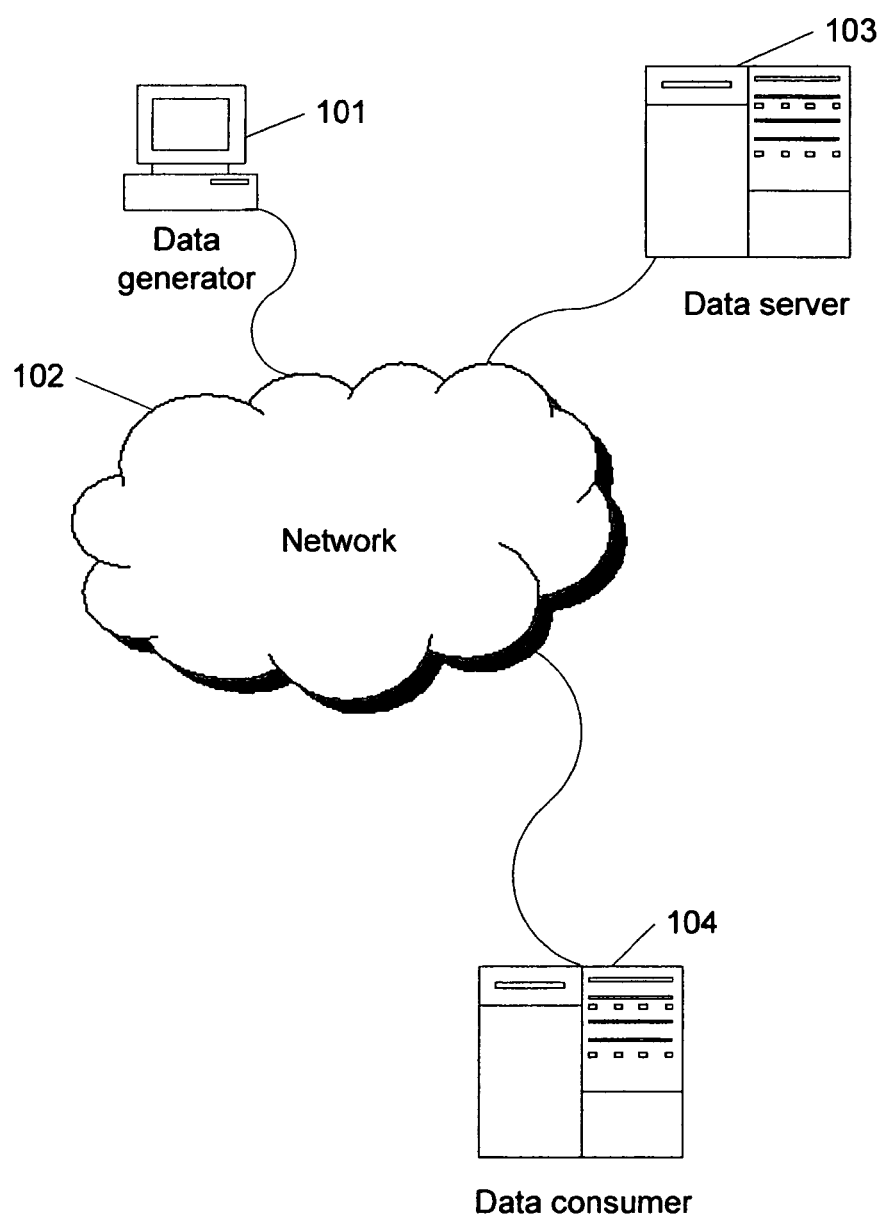
FIG. 1 is a diagram of a system for data privacy, according to some embodiments.

FIG. 1 is a diagram of a system for data privacy, according to some embodiments. In this example, a data generator 101 may be connected to a network 102. A data generator may be any device capable of generating or transmitting data for which privacy may be desired. Examples of a data generator include a personal computer, a PDA, an internet appliance, a cell phone, a digital recording device such as a digital camera, scientific instrumentation, and an event recorder such as an automotive "black box." In some embodiments, a data generator 101 may unreadably store data. In some embodiments, a data generator 101 may transmit sensitive data through a network 102 to a data server 103 and/or a data consumer 104. Sensitive data and sensitive information refer interchangeably herein to information for which privacy may be desired. Examples of sensitive information include personally identifiable information such as a such as name and/or address information or a social security number, and credentials, for example a driver's license number or a financial credential such as a credit or debit card number, bank account number, or brokerage account number.

The network 102 may be any type of network, for example a public network such as the internet or a cellular phone network. In another example, the network 102 may be an enterprise or home network, a virtual private network, or a wireless network such as an 802.11 or Bluetooth network. In some embodiments, a network may include, in whole or in part, a point-to-point connection such as a USB, FireWire, serial or parallel connection. In some embodiments, the network 102 may include more than one network. An example of a network 102 including more than one network is a local area network connected to a public network such as the internet.

A data server 103 may be connected to the network 102. The data server 103 may be any entity capable of receiving and optionally storing privacy-protected data. One example of a data server 103 is a device to which a digital recording device can be connected. Another example of a data server 103 is a document server such as a web server, which may receive data such as form submissions through a protocol such as HTTP. In some embodiments, a data server 103 may receive data that is unreadable to the data sender, and decrypt the data. In some embodiments, a data server 103 may receive data that is unreadable to it. In some embodiments, such unreadable data may subsequently be decoded at or with the assistance of a data generator 101 and/or a data consumer 104.

In some embodiments, a data consumer 104 may receive data through the network 102 from a data server 103 and/or a data generator 101. In some embodiments, such data may be unreadable to the sender, and may be decrypted by the data consumer 104. An example of a data consumer 104 is an authority such as a transaction approver or processor.

Further details of the operations of the data generator 101, the data server 103 and the data consumer 104 are discussed in conjunction with the remaining Figures.

Figure 2:
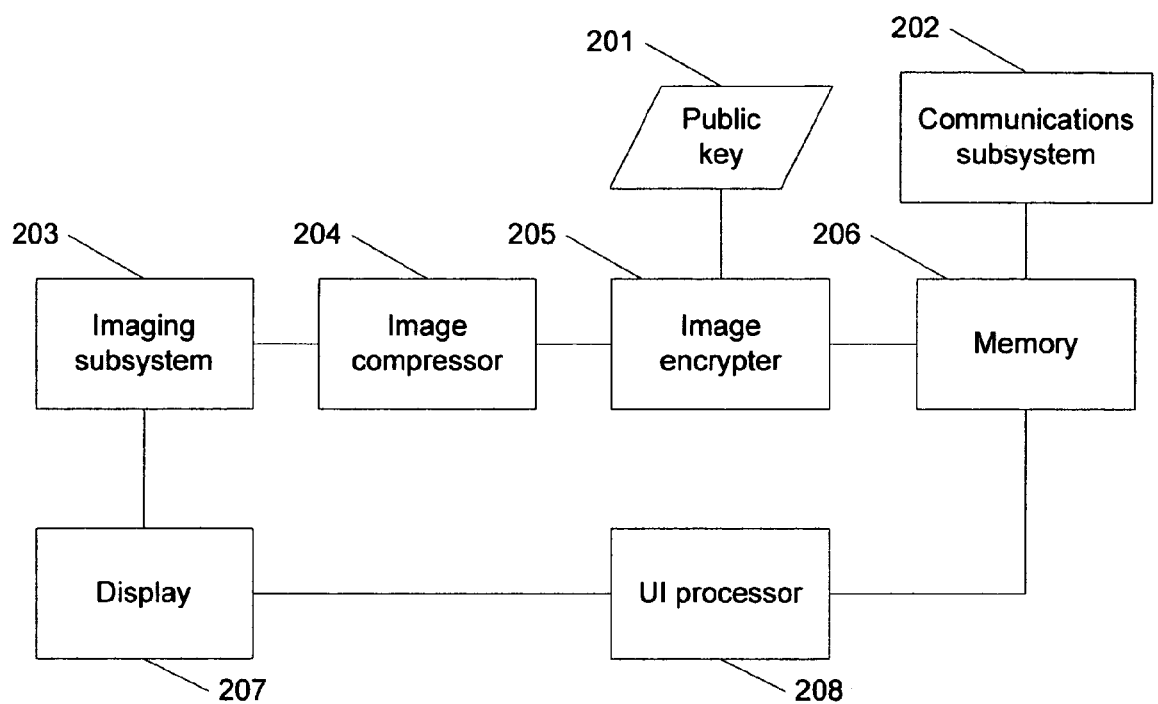
FIG. 2 is an illustrative diagram of a system for a digital camera incorporating data privacy, according to some embodiments.

FIG. 2 is an illustrative diagram of a system for a digital camera incorporating data privacy, according to some embodiments. In some embodiments, the system exemplified by this FIG. 2 may be a data generator 101 of FIG. 1. In this example, an imaging subsystem 203 comprises elements for capturing an image, which may include optical components such as one or more lenses, mechanical components such as focusing, anti-jitter, and zoom componentry, and imaging components such as one or more CCDs. In some embodiments, the imaging subsystem 203 may include hardware and/or software for modifying an image's appearance, for example by applying various image processing transforms and filters known to those skilled in the art. The imaging subsystem may be connected to an optional display 207, which may provide an opportunity to visually see an image before and/or after it is captured. An example of a display 207 is an embedded LCD display. A UI processor 208 may display user interface information on the display 207, and may process inputs from buttons, sliders and other input devices.

The imaging subsystem 203 may provide image data to an image compressor 204, which may include software and/or hardware for compressing an image, for example using JPEG compression. Techniques for image compression are well known to those skilled in the art. The image compressor 204 may provide compressed and/or pass-through image data to an image encrypter 205. The image encrypter 205 may encrypt the image, for example using a public cryptographic key 201. In some embodiments, the image encrypter 205 may use a public key cryptosystem such as RSA or El Gamal. In some embodiments, at the time data is encrypted, the image encrypter 205 and the other components of this FIG. 2 may not have a private key corresponding to the public key 201 used for encrypting the data. In some embodiments, data or key material relating to one or more encryptions may be stored in a memory 206. An example of such key material is a symmetric key sufficient for deciphering specific encrypted data. In some embodiments, the data or key material retained in a memory 206 may be related to recent encryptions. For example, data or key material relating to the most recent encryption(s) may be temporarily retained.

The image encrypter 205 may provide data to the memory 206, which may store image data. Examples of a memory include flash memory, either fixed or removable, such as an SD card, MMC card, CF card, Memory Stick, or other form factor; magnetic storage, either fixed or removable, and optical storage. In some embodiments, a communications subsystem 202 may transmit stored image data and optionally metadata from the memory 206, for example over a network such as network 102 of FIG. 1, to a data server such as data server 103 of FIG. 1. In some embodiments, a communications subsystem 202 may receive a new key 201 through a network such as network 102 of FIG. 1, from a data server such as data server 103 of FIG. 1. In some embodiments, a communications subsystem 202 may receive a reading key enabling decryption of image data encrypted using the public key 201. Further details of the operation of a digital camera incorporating data privacy as shown in this FIG. 2 are provided in conjunction with the remaining Figures.

Figure 3:
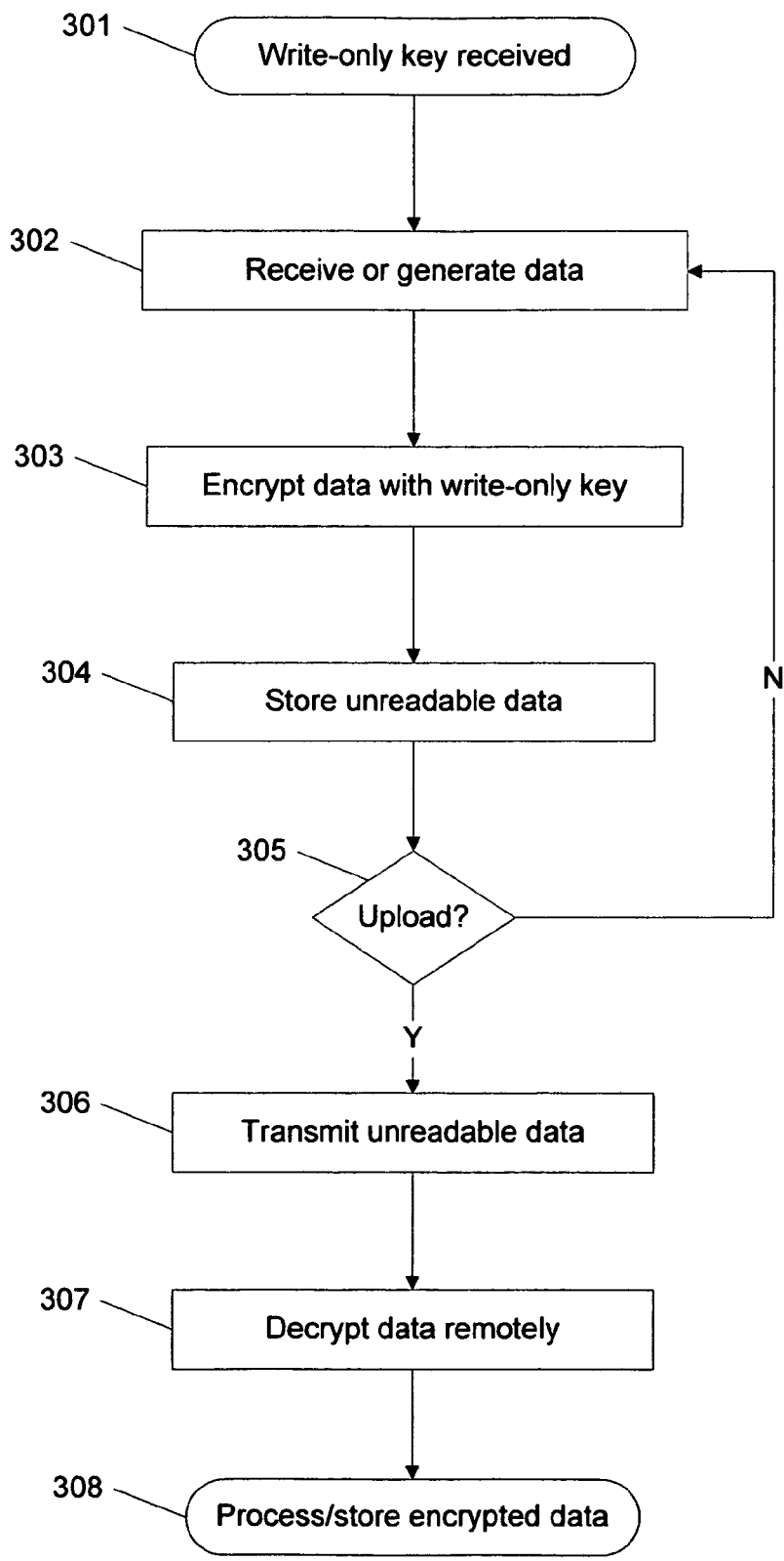
FIG. 3 is a flow diagram of a method for storing and retrieving unreadable data, according to some embodiments.

FIG. 3 is a flow diagram of a method for storing and retrieving unreadable data, according to some embodiments. Unreadable data refers herein to data whose possessor is unable to decode it, for example because the unreadable data is encrypted and its possessor does not possess a decryption key that can decrypt the data. An example of unreadable data is data encoded with a public key for which the entity encoding and/or storing the data does not have a corresponding private key. In this example, a write-only key may be received (301). A write-only key refers herein to an encryption key with which data may be encrypted, and with which the encrypted data may not subsequently be decrypted. A write-only key, as used herein, may be an encryption component of an asymmetric key set, such as the public half of a public/private key pair. A reading key refers herein to a decryption key with which data previously encrypted by a write-only key may be encrypted. A reading key, as used herein, may be the decryption component of an asymmetric key set, such as the private half of a public/private key pair. A write-only/reading or public/private key pair may, for example, be a key pair usable for encrypting and decrypting data using an asymmetric cryptosystem such as RSA, El Gamal or MQV. The term "public key" is used interchangeably herein interchangeably with the term "write-only key." The term "private key" is used herein interchangeably with the term "reading key." Public key cryptography may be used herein to refer to any asymmetric cryptosystem, i.e. any cryptographic techniques in which the keys used for encrypting and decrypting are distinct. Public key cryptosystems are well known to those skilled in the art and are, for example, described in IEEE proposed standard 1363, drafts of which are available from the IEEE.

Data may be received or generated (302). Data may be encrypted with the write-only key (303), making the data unreadable. Unreadable data may be stored (304). When it is determined to be time to upload unreadable data so it may become readable (305), the data may be transmitted to a location at which a reading key is possessed that corresponds to the write-only key with which the data was encrypted (306), such as a data server 103 of FIG. 1. The data may be decrypted (307), and stored or processed (308). Further details of the techniques of FIG. 3 are discussed in the following Figures.

Figure 4A:
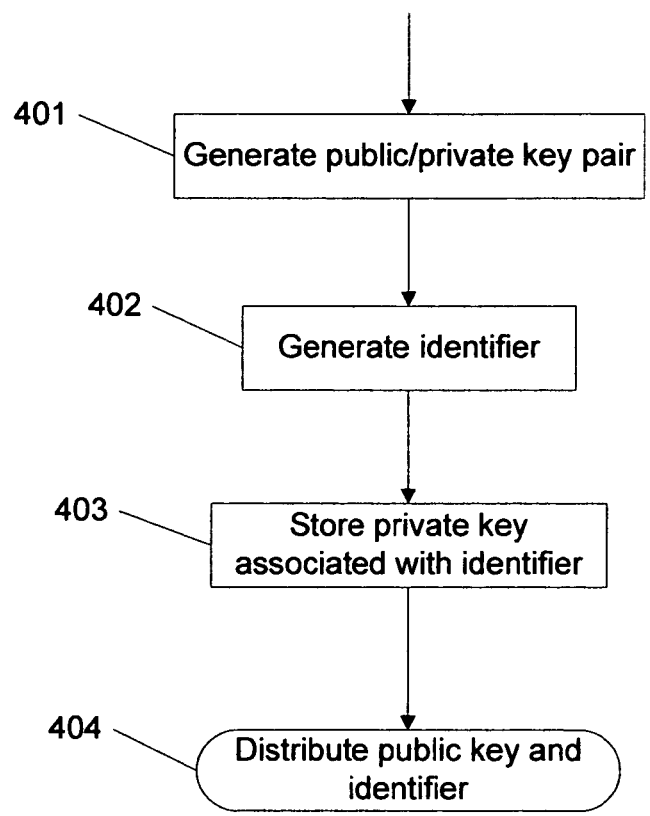
FIG. 4A is a flow diagram of a method for generating and distributing a write-only key, according to some embodiments.

FIG. 4A is a flow diagram of a method for generating and distributing a write-only key, according to some embodiments. In this example, a public/private key pair may be generated (401). The public/private key pair may be generated in accordance with any public key cryptography technique known to those skilled in the art, for example RSA or El Gamal. In some embodiments, an identifier may be generated (402). An identifier may, for example, be a sequentially generated integer, or a randomly generated integer. In some embodiments, an identifier may be related to the intended recipient of the write-only key. The private key may be associated with the identifier and stored (403), for example in a database table in which the identifier may be a primary key. The public key and optionally the identifier may be distributed (404). An example of distribution is to transmit the public key and optional identifier to a recipient, for example a recipient who has requested a write-only key over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, the identifier is already known to the recipient and need not be transmitted. In some embodiments, the recipient may be a digital recording device such as a digital camera, for example as described in conjunction with FIG. 2.

Figure 4B:
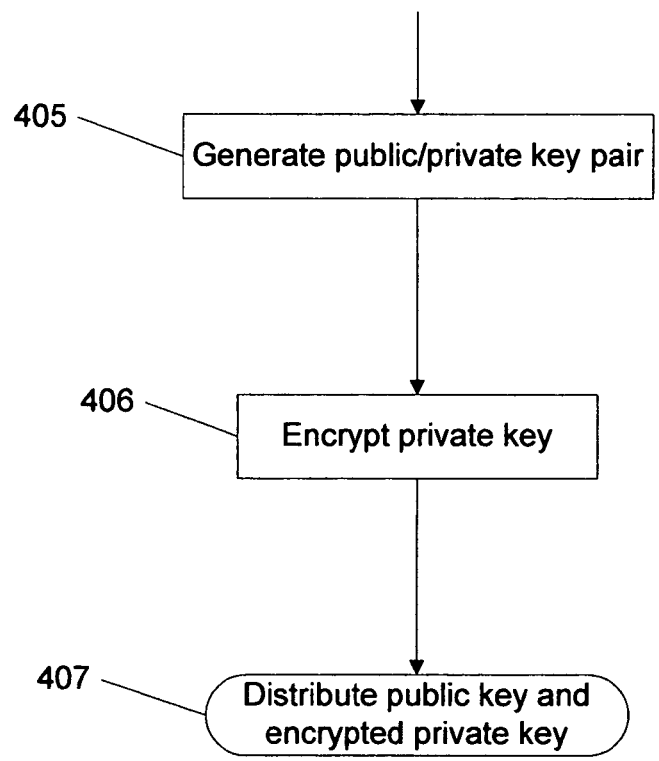
FIG. 4B is a flow diagram of a method for generating and distributing a write-only key, according to some embodiments.

FIG. 4B is a flow diagram of a method for generating and distributing a write-only key, according to some embodiments. In this example, a public/private key pair may be generated (405). The public/private key pair may be generated in accordance with any public key cryptography technique known to those skilled in the art, for example RSA or El Gamal. The private key may be encrypted (406). An example of encrypting the private key is to encrypt it with a symmetric cipher such as DES, Triple-DES, AES or Blowfish, wherein the key used by the symmetric cipher, herein referred to as the "escrow key," is retained. An example of retaining an escrow key is to store it in a nonvolatile memory such as magnetic storage, optical storage or flash memory. In some embodiments, escrow keys may be changed periodically and associated with reference numbers or time intervals. In this example, a reference number or timestamp may be associated with the encrypted private key corresponding to the reference number of the escrow key used to encrypt the private key, or the time at which the encryption was performed. The public key and encrypted private key may be distributed (407). An example of distribution is to transmit the public key and encrypted private key to a recipient, for example a recipient who has requested a write-only key over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, the recipient may be a digital recording device such as a digital camera, for example as described in conjunction with FIG. 2.

Figure 5A:
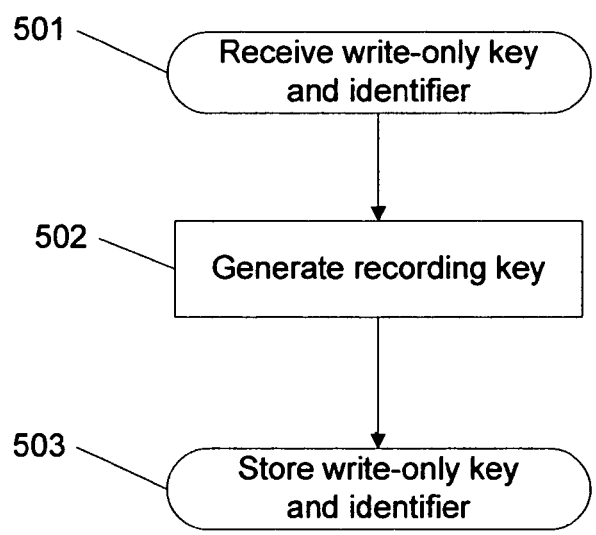
FIG. 5A is a flow diagram of a method for receiving a write-only key, according to some embodiments.

FIG. 5A is a flow diagram of a method for receiving a write-only key, according to some embodiments. In some embodiments, the method of this FIG. 5A may be performed by a digital recording device such as a digital camera, for example as described in conjunction with FIG. 2. In this example, a write-only key and optional identifier may be received (501). In some embodiments, the write-only key and optional identifier may have been transmitted as described in conjunction with FIG. 4A. An example of receiving a write-only key and associated identifier is to receive them over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, an identifier may be predetermined, for example associated with a device receiving the write-only key.

In some embodiments, a recording key may be generated (502). An example of generating recording a recording key is to generate a key for a symmetric cipher such as DES, Triple-DES, AES or Blowfish, wherein a key used by the symmetric cipher is stored. In some embodiments, a recording key may be generated from a password, for example by receiving a password (for example from a user) and generating a key using a hash such as SHA1 or MD5 and/or a cipher, for example a stream cipher such as RC4. In some embodiments, a recording key may be generated implicitly, for example by using a predetermined recording key. The write-only key, optional recording key and optional identifier may be stored (503), for example on a flash memory, optical media or magnetic recording device recording device.

Figure 5B:
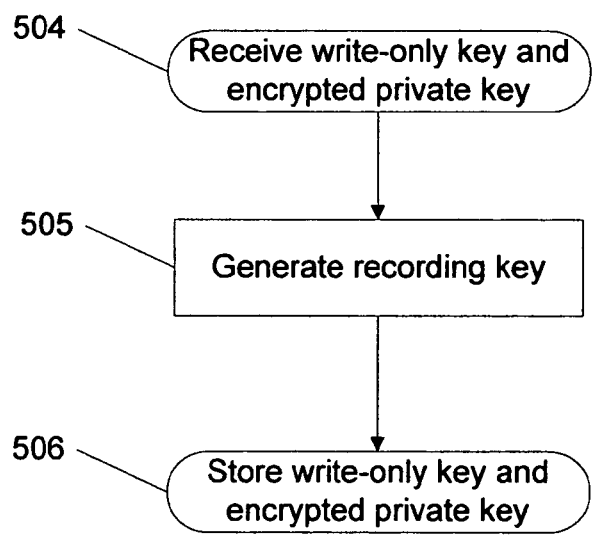
FIG. 5B is a flow diagram of a method for receiving a write-only key, according to some embodiments.

FIG. 5B is a flow diagram of a method for receiving a write-only key, according to some embodiments. In some embodiments, the method of this FIG. 5B may be performed by a digital recording device such as a digital camera, for example as described in conjunction with FIG. 2. In this example, a write-only key and encrypted private key may be received (504). In some embodiments, the write-only key and encrypted private key may have been transmitted as described in conjunction with FIG. 4B. An example of receiving a write-only key and encrypted private key is to receive them over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication.

In some embodiments, a recording key may be generated (505). A recording key may be any key used for encrypting and/or decrypting data. An example of generating recording a recording key is to generate a key for a symmetric cipher such as DES, Triple-DES, AES or Blowfish, wherein a key used by the symmetric cipher is stored. In some embodiments, a recording key may be generated from a password, for example by receiving a password (for example from a user) and generating a key using a cryptographic hash such as SHA1 or MD5 and/or a cipher, for example a stream cipher such as RC4. In some embodiments, a recording key may be generated implicitly, for example by using a predetermined recording key. The write-only key, encrypted private key and optional recording key may be stored (506), for example on a flash memory, optical media or magnetic recording device recording device.

Figure 6:
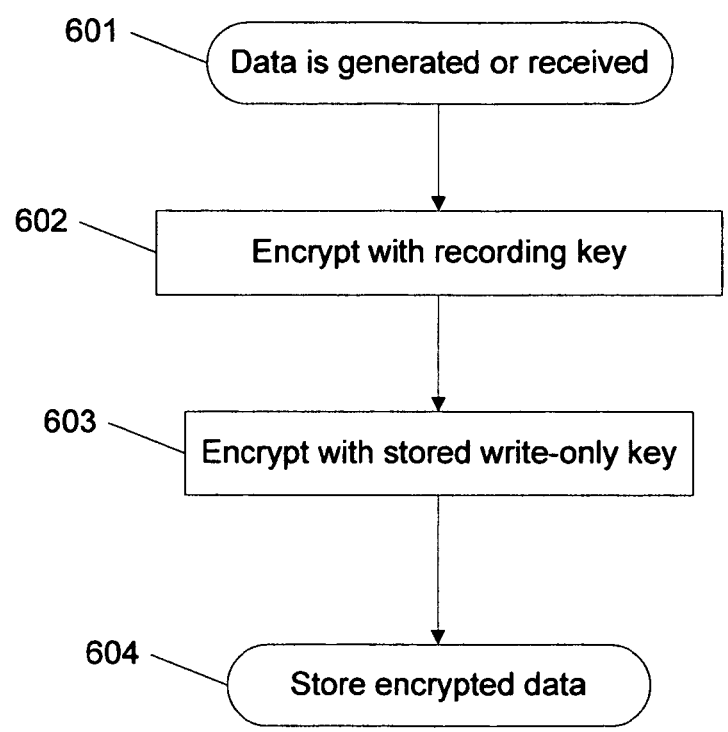
FIG. 6 is a flow diagram of a method for encrypting data using a write-only key, according to some embodiments.

FIG. 6 is a flow diagram of a method for encrypting data using a write-only key, according to some embodiments. In this example, data may be generated or received (601). An example of generating data is to capture an image using a CCD and optionally filter, transform and/or compress the image, for example using an image compression technique such as JPEG. Another example of generating data is to capture periodic readings of instrumentation. Another example of generating data is to capture output from a program running on a computing device. An example of receiving data is to receive data over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication.

In some embodiments, data may be encrypted with an optional recording key, for example by using a symmetric cipher such as DES, Triple-DES, AES or Blowfish (602). In some embodiments, a recording key may be a key generated as discussed in conjunction with FIG. 5A or 5B. The data may be encrypted using a stored write-only key (603). A stored write-only key may, for example, have been received as described in conjunction with FIG. 5A or 5B. In some embodiments, encrypting data using a write-only key may include direct encryption using an asymmetric encryption algorithm such as RSA or El Gamal. In some embodiments, encrypting data using a public key may include generating a symmetric key, encrypting the data using the symmetric key and a symmetric encryption algorithm such as DES, Triple-DES, AES or Blowfish, encrypting the symmetric key using an asymmetric encryption algorithm and the public key, and associating the encrypted symmetric key with the encrypted data. Encrypted data may be stored (604), for example on a flash memory, optical media or magnetic recording device recording device.

In some embodiments, the method of this FIG. 6 may be performed by a digital recording device such as a digital camera, for example as described in conjunction with FIG. 2. In some embodiments, the method of this FIG. 6 may be performed by an event recorder, or a computing device, for example a computing device incorporating a write-only filesystem. In this example, a write-only filesystem may include an accumulative file store such as a log-based file store.

Figure 7A:
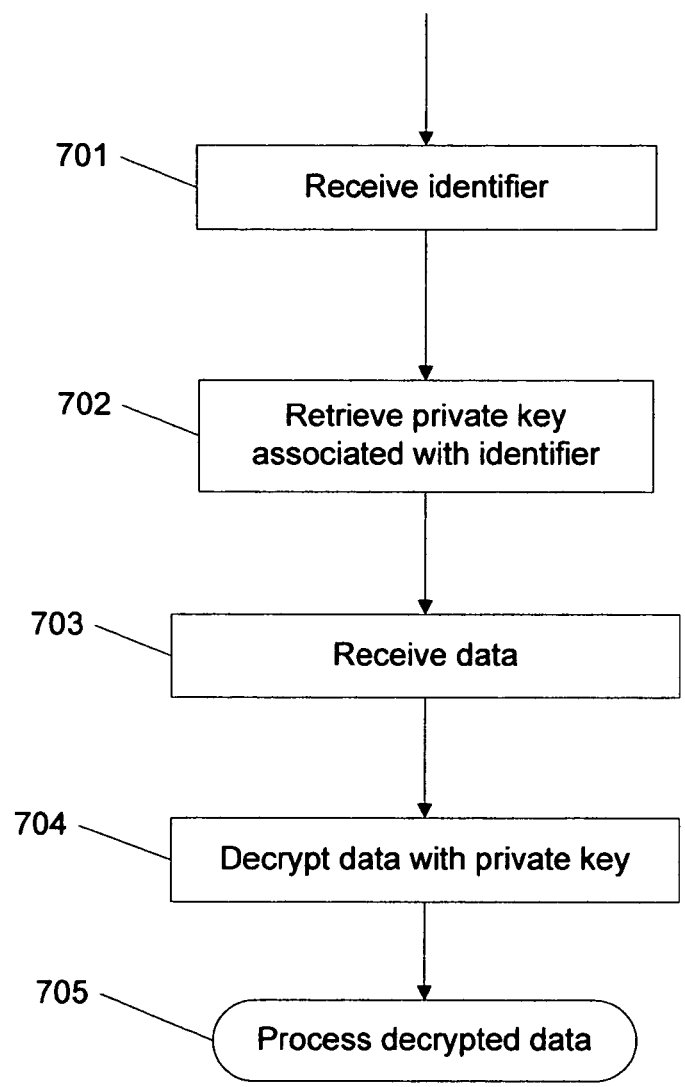
FIG. 7A is a flow diagram of a method for decrypting data received from a write-only data source, according to some embodiments.

FIG. 7A is a flow diagram of a method for decrypting data received from a write-only data source, according to some embodiments. A write-only data source refers herein to any source of encrypted data wherein the device or party that is the source of encrypted data lacks a private key required to decrypt the data. In some embodiments, a write-only data source may be a digital recording device such as a digital camera, for example as described in conjunction with FIG. 2.

In this example, an identifier may optionally be received (701). An example of receiving an identifier is to receive it over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, the identifier may be transmitted implicitly, for example by the use of a client authentication certificate while establishing an SSL connection, or inferred automatically, for example from the identity of the client.

A private key associated with the identifier may be retrieved (702). A private key may, for example, have been stored as described in conjunction with FIG. 4A. Encrypted data may be received (703). Encrypted data may, for example, have been encrypted with a corresponding public key as described in conjunction with FIG. 6. The encrypted data may be decrypted with the private key (704). The data may be processed (705). Examples of processing data include storing the data, transmitting the data, processing and/or printing images represented by the data, or presenting the data, for example on a display device such as a monitor or embedded display or embedded display.

Figure 7B:
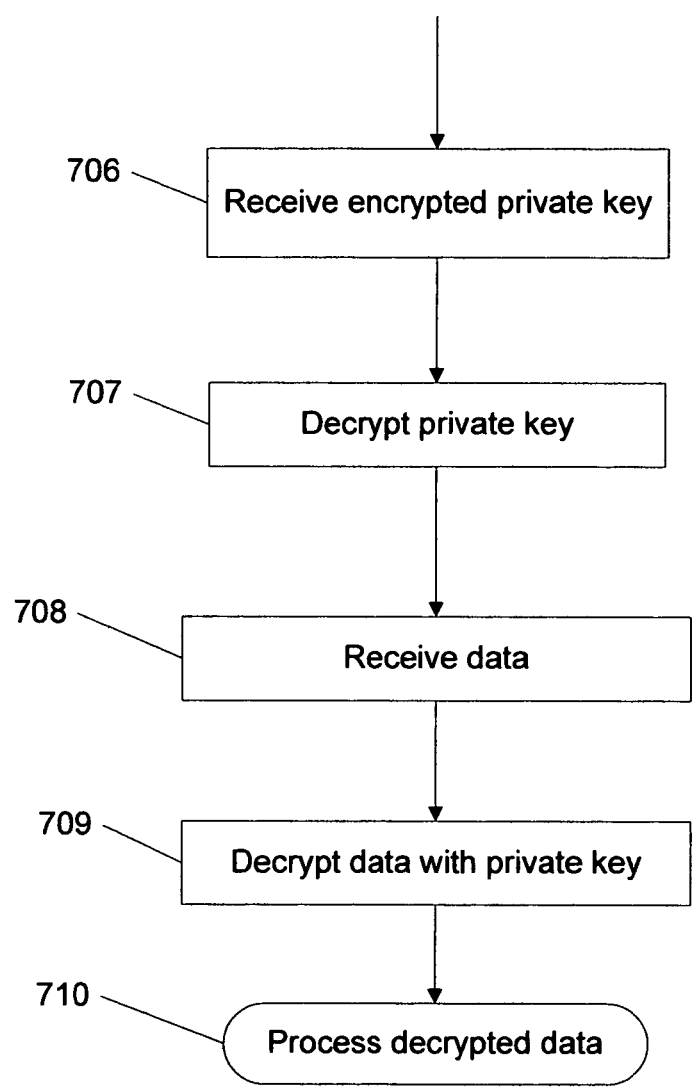
FIG. 7B is a flow diagram of a method for decrypting data received from a write-only data source, according to some embodiments.

FIG. 7B is a flow diagram of a method for decrypting data received from a write-only data source, according to some embodiments. In some embodiments, a write-only data source may be a digital recording device such as a digital camera, for example as described in conjunction with FIG. 2.

In this example, an encrypted private key may be received (706). An example of receiving an encrypted private key is to receive it over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. The private key associated with the identifier may be decrypted (707). An example of decrypting the private key is to decrypt it with a symmetric cipher such as DES, Triple-DES, AES or Blowfish, wherein the key used by the symmetric cipher is a retained escrow key. The escrow key may have been previously used to encrypt the private key, for example as was described in conjunction with FIG. 4B. In some embodiments, an encrypted private key may be associated with an identifier such as a reference number or a timestamp, which may be used to select an appropriate escrow key, for example by looking up an appropriate escrow key in a database such as a relational database.

Encrypted data may be received (708). Encrypted data may, for example, have been encrypted with a corresponding public key as described in conjunction with FIG. 6. The encrypted data may be decrypted with the private key (709). The data may be processed (710). Examples of processing data include storing the data, transmitting the data, processing and/or printing images represented by the data, or presenting the data, for example on a display device such as a monitor or embedded display.

Figure 8A:
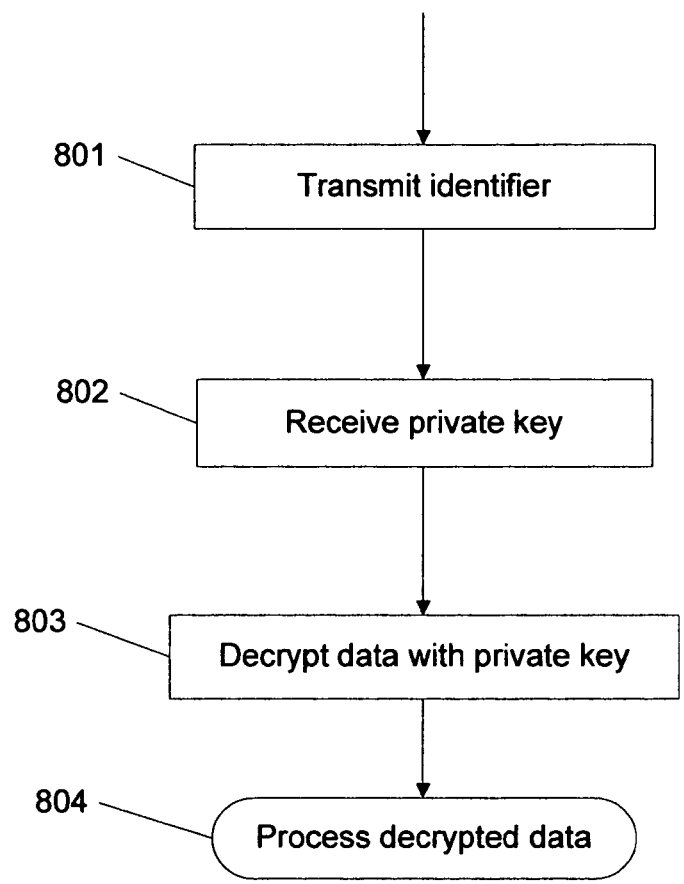
FIG. 8A is a flow diagram of a method for receiving a reading key at a write-only data source, according to some embodiments.

FIG. 8A is a flow diagram of a method for receiving a reading key at a write-only data source, according to some embodiments. In this example, an identifier may optionally be transmitted (801). An example of transmitting an identifier is to transmit it over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, an identifier may have been received as discussed in conjunction with FIG. 5A. In some embodiments, the identifier may be transmitted implicitly, for example by the use of a client authentication certificate while establishing an SSL connection.

A private key may be received (802). Encrypted data may be decrypted with the private key (803). Encrypted data may, for example, have been encrypted with a corresponding public key as described in conjunction with FIG. 6. The data may be processed (804). Examples of processing data include storing the data, transmitting the data, processing and/or printing images represented by the data, or presenting the data, for example on a display device such as a monitor or embedded display. In some embodiments, the technique of this FIG. 8A may be performed by a digital recording device such as a digital camera, for example as described in conjunction with FIG. 2.

Figure 8B:
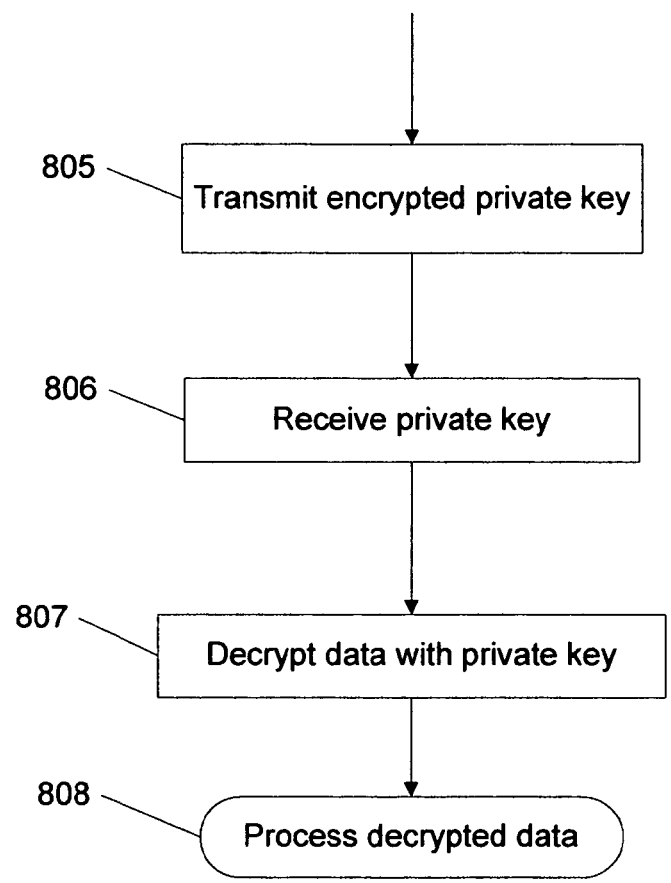
FIG. 8B is a flow diagram of a method for receiving a reading key at a write-only data source, according to some embodiments.

FIG. 8B is a flow diagram of a method for receiving a reading key at a write-only data source, according to some embodiments. In this example, an encrypted private key may be transmitted (805). An example of transmitting an encrypted private key is to transmit it over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, an encrypted private key may have been received as discussed in conjunction with FIG. 5B.

A decrypted private key may be received (806). Encrypted data may be decrypted with the private key (807). Encrypted data may, for example, have been encrypted with a corresponding public key as described in conjunction with FIG. 6. The data may be processed (808). Examples of processing data include storing the data, transmitting the data, processing and/or printing images represented by the data, or presenting the data, for example on a display device such as a monitor or embedded display. In some embodiments, the technique of this FIG. 8B may be performed by a digital recording device such as a digital camera, for example as described in conjunction with FIG. 2.

Figure 9A:
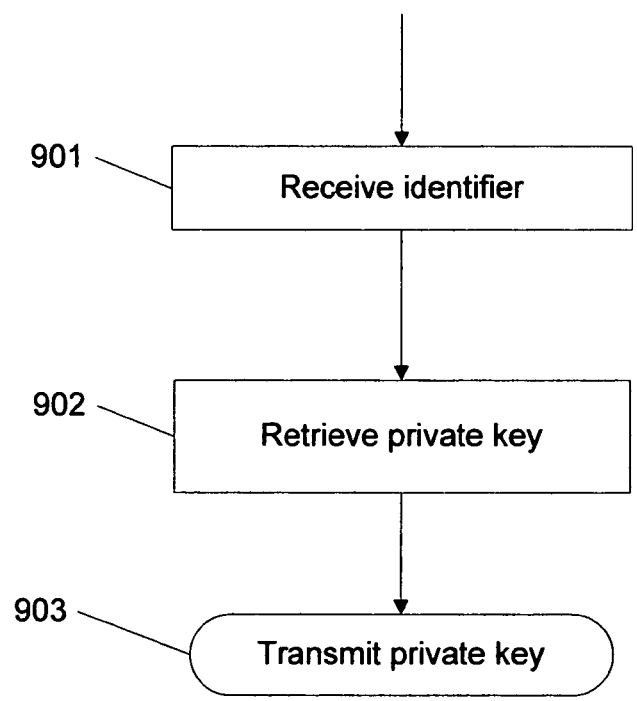
FIG. 9A is a flow diagram of a method for transmitting a reading key to a write-only data source, according to some embodiments.

FIG. 9A is a flow diagram of a method for transmitting a reading key to a write-only data source, according to some embodiments. In some embodiments, a write-only data source may be a digital recording device such as a digital camera, for example as described in conjunction with FIG. 2. In this example, an identifier may optionally be received (901). An example of receiving an identifier is to receive it over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, the identifier may be transmitted implicitly, for example by the use of a client authentication certificate while establishing an SSL connection. In some embodiments, the identifier may be received from the write-only data source, for example as described in conjunction with FIG. 8A.

A private key associated with the identifier may be retrieved (902). A private key may, for example, have been stored as described in conjunction with FIG. 4A. The private key may be transmitted (903), for example back to the party that transmitted the associated identifier. An example of transmitting a private key is to transmit it over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication.

Figure 9B:
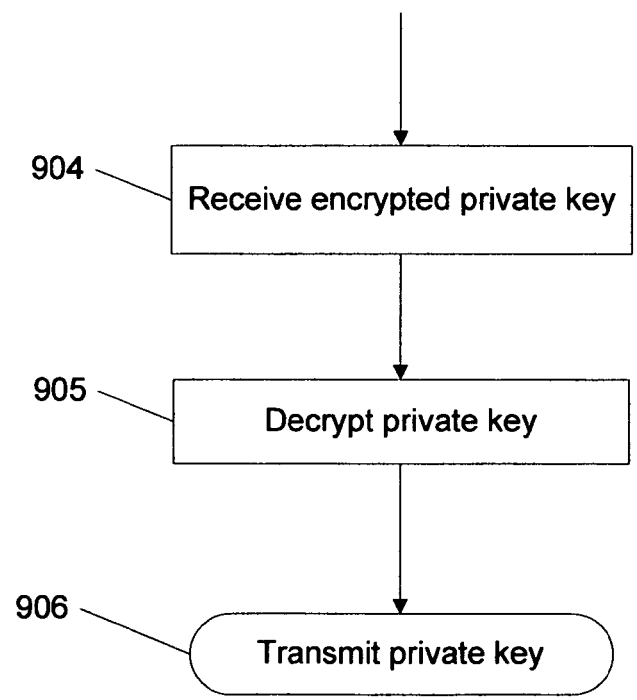
FIG. 9B is a flow diagram of a method for transmitting a reading key to a write-only data source, according to some embodiments.

FIG. 9B is a flow diagram of a method for transmitting a reading key to a write-only data source, according to some embodiments. In some embodiments, a write-only data source may be a digital recording device such as a digital camera, for example as described in conjunction with FIG. 2. In this example, an encrypted private key may be received (904). An example of receiving an encrypted private key is to receive it over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication.

The encrypted private key may be decrypted (905). An example of decrypting the private key is to decrypt it with a symmetric cipher such as DES, Triple-DES, AES or Blowfish, wherein the key used by the symmetric cipher is a retained escrow key. The escrow key may previously have been used to encrypt the private key, for example as described in conjunction with FIG. 4B. In some embodiments, an encrypted private key may be associated with an identifier such as a reference number or a timestamp, which may be used to select an appropriate escrow key, for example by looking up an appropriate escrow key in a database such as a relational database. The private key may be transmitted (906), for example back to the party that transmitted the encrypted private key. An example of transmitting a private key is to transmit it over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication.

Figure 10:
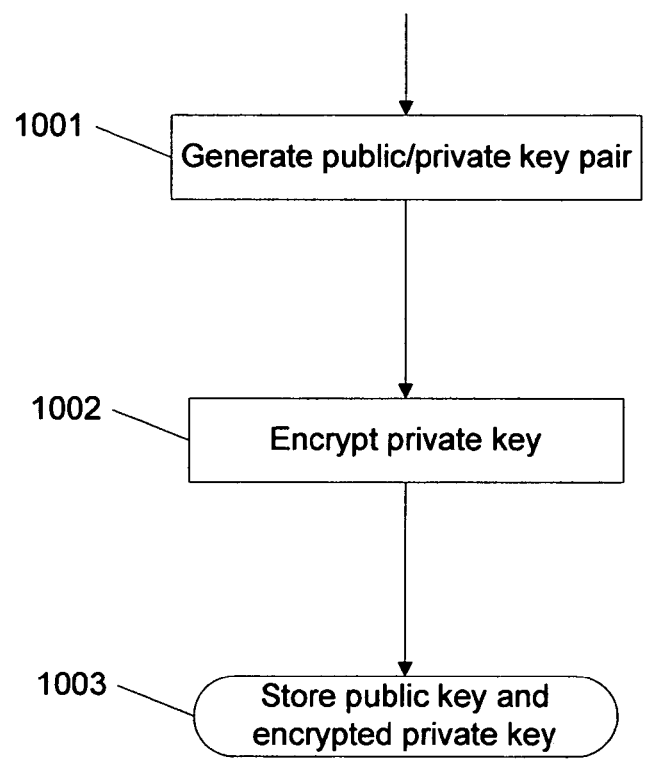
FIG. 10 is a flow diagram of a method for generating a write-only key and corresponding encrypted reading key, according to some embodiments.

FIG. 10 is a flow diagram of a method for generating a write-only key and corresponding encrypted reading key, according to some embodiments. In this example, a public/private key pair may be generated (1001). The public/private key pair may be generated in accordance with any public key cryptography technique known to those skilled in the art, for example RSA or El Gamal.

The private key may be encrypted (1002). An example of encrypting the private key is to encrypt it with a symmetric cipher such as DES, Triple-DES, AES or Blowfish using an escrow key. In some embodiments, an escrow key may be generated from a password, for example by receiving a password (for example from a user) and generating an escrow key using a cryptographic hash such as SHA1 or MD5 and/or a cipher, for example a stream cipher such as RC4.

The public key and encrypted private key may be stored (1003), for example on a flash memory, optical media or magnetic recording device recording device. In some embodiments, data received after this technique has been applied may be encrypted with the stored public key, for example as discussed in conjunction with FIG. 6. In some embodiments, a device generating a write-only key and corresponding encrypted reading key may be an event recorder, or a computing device, for example a computing device incorporating a write-only filesystem. In this example, a write-only filesystem may include an accumulative file store such as a log-based file store.

Figure 11:
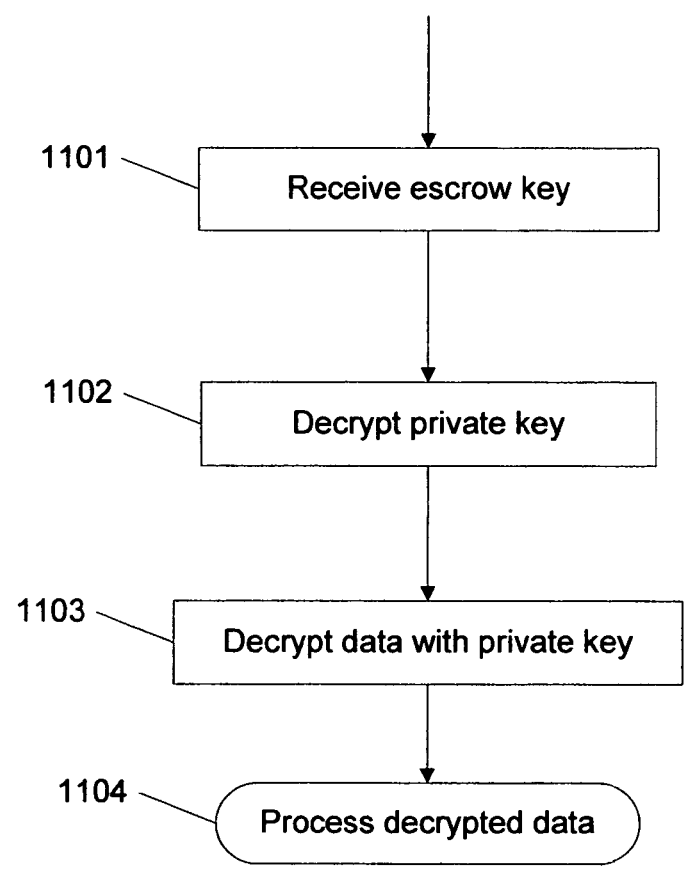
FIG. 11 is a flow diagram of a method for decrypting unreadable data, according to some embodiments.

FIG. 11 is a flow diagram of a method for decrypting unreadable data, according to some embodiments. In this example, an escrow key may be received (1101). An example of receiving an escrow key is to receive it over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. Another example of receiving an escrow key is to generate an escrow key from a password, for example by receiving a password (for example from a user) and generating a key using a hash such as SHA1 or MD5 and/or a cipher, for example a stream cipher such as RC4.

A stored private key may be decrypted (1102). A stored private key may, for example, have been stored as discussed in conjunction with FIG. 5B or FIG. 10. An example of decrypting the private key is to decrypt it with a symmetric cipher such as DES, Triple-DES, AES or Blowfish, wherein the key used by the symmetric cipher is the escrow key received in 1101. Encrypted data may be decrypted using the decrypted private key (1103). Encrypted data may, for example, have been encrypted with a corresponding public key as described in conjunction with FIG. 6.

The data may be processed (1104). Examples of processing data include storing the data, transmitting the data, processing and/or printing images represented by the data, or presenting the data, for example on a display device such as a monitor or embedded display. In some embodiments, the method of this FIG. 11 may be performed by an event recorder, or a computing device, for example a computing device incorporating a write-only filesystem. In this example, a write-only filesystem may include an accumulative file store such as a log-based file store.

Figure 12A:
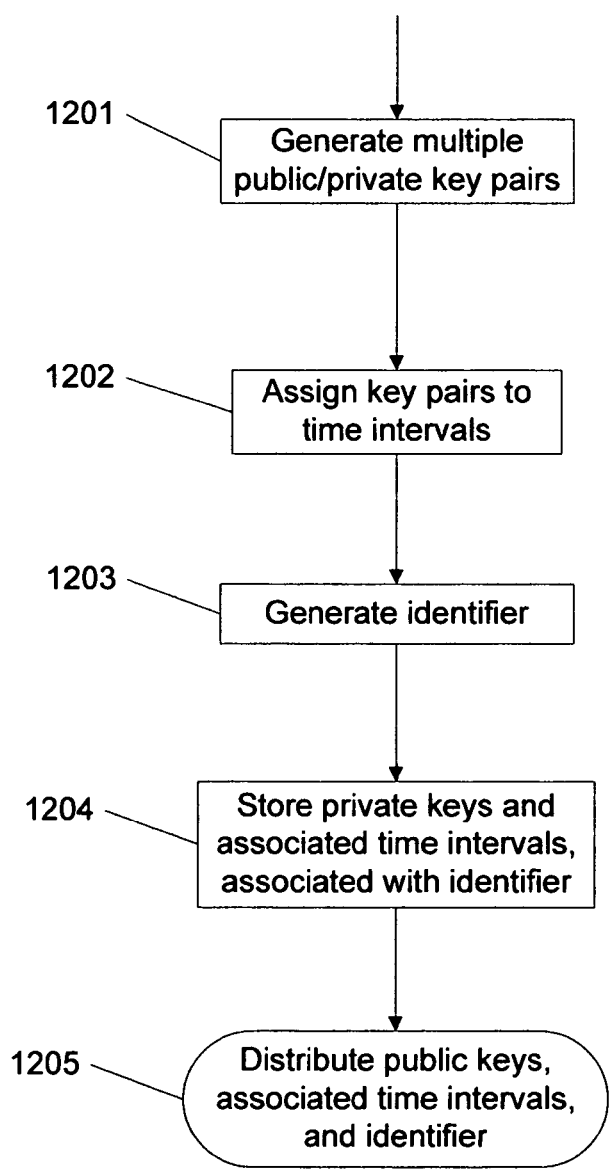
FIG. 12A is a flow diagram of a method for generating a series of write-only keys, according to some embodiments.

FIG. 12A is a flow diagram of a method for generating a series of write-only keys, according to some embodiments. In this example, multiple public/private key pairs may be generated (1201). These key pairs may be generated in accordance with any public key cryptography technique known to those skilled in the art, for example RSA or El Gamal. Each key pair may be assigned to a time interval (1202). For example, the first key pair may be assigned to an interval beginning at the current time, and each successive key may be assigned an interval beginning a predetermined period of time, for example one day, after the previous key pair's interval starts. In this example, each interval may be for a fixed duration, for example one day.

An identifier may be generated (1203). An identifier may, for example, be a sequentially generated integer, or a randomly generated integer. In some embodiments, this identifier may relate to the recipient of the write-only keys. The private keys and associated time intervals may be associated with the identifier and stored (1204).

The public keys, associated time intervals and optional identifier may be distributed (1205). In some embodiments, the identifier may already be known to the recipient and need not be transmitted. An example of distribution is to transmit the public keys, associated time intervals and optional identifier to a recipient, for example over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, the recipient may be an event recording device such as a vehicular "black box." An example of a vehicular black box is a device that receives and stores inputs characterizing vehicle state, such as location, velocity, acceleration, and degree of application of brakes.

Figure 12B:
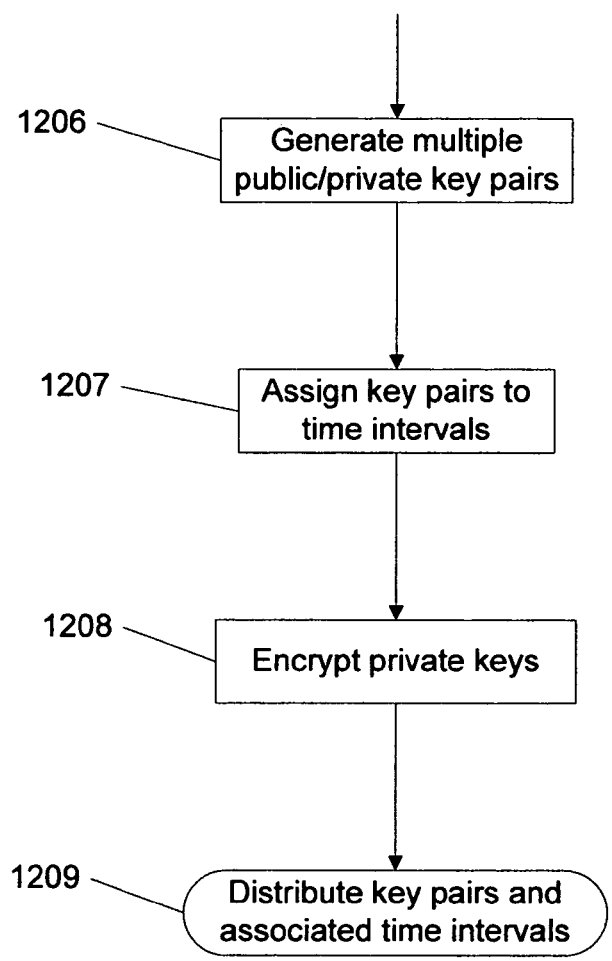
FIG. 12B is a flow diagram of a method for generating a series of write-only keys, according to some embodiments.

FIG. 12B is a flow diagram of a method for generating a series of write-only keys, according to some embodiments. In this example, multiple public/private key pairs may be generated (1206). These key pairs may be generated in accordance with any public key cryptography technique known to those skilled in the art, for example RSA or El Gamal. Each key pair may be assigned to a time interval (1207). For example, the first key pair may be assigned to an interval beginning at the current time, and each successive key may be assigned an interval beginning a predetermined period of time, for example one day, after the previous key pair's interval starts. In this example, each interval may be for a fixed duration, for example one day.

The private keys may be encrypted (1208). An example of encrypting the private keys is to encrypt each private key with a symmetric cipher such as DES, Triple-DES, AES or Blowfish using an escrow key, wherein the escrow key is retained. One example of retaining an escrow key is to store it in a nonvolatile memory such as magnetic storage, optical storage or flash memory. Another example of retaining an escrow key is to change escrow keys periodically and associate escrow keys with reference numbers or time intervals. In this example, a reference number or timestamp may be associated with an encrypted private key corresponding to the reference number of the escrow key used to encrypt the private key, or the time at which the encryption was performed.

The public keys, encrypted private keys and associated time intervals may be distributed (1209). An example of distribution is to transmit the public keys, encrypted private keys and associated time intervals to a recipient, for example over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, the recipient may be an event recording device such as a vehicular "black box."

Figure 13A:
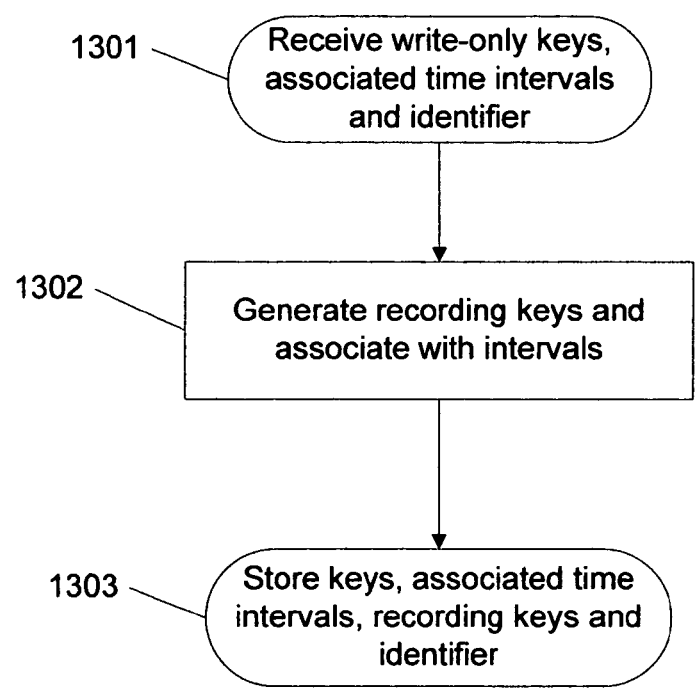
FIG. 13A is a flow diagram of a method for receiving a series of write-only keys, according to some embodiments.

FIG. 13A is a flow diagram of a method for receiving a series of write-only keys, according to some embodiments. In this example, write-only keys and associated time intervals may be received, along with an optional identifier (1301). An example of receiving write-only keys, associated time intervals and an optional identifier is to receive them over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, an identifier may be predetermined, for example associated with the receiving device. In some embodiments, the write-only keys, associated time intervals and optional identifier may have been transmitted as described in conjunction with FIG. 12A.

In some embodiments, recording keys may be generated and associated with time intervals (1302). An example of generating recording keys is to generate keys for a symmetric cipher such as DES, Triple-DES, AES or Blowfish. Recording keys may be generated from a password, for example by receiving a password (for example from a user) and generating a key using a hash such as SHA1 or MD5 and/or a cipher, for example a stream cipher such as RC4. In some embodiments, recording keys may be generated implicitly, for example by using predetermined recording keys. The write-only keys, time intervals, optional recording keys and optional identifier may be stored (1303), for example on a flash memory, optical media or magnetic recording device recording device. In some embodiments, the techniques of this FIG. 13A may be performed by an event recording device such as a vehicular "black box."

Figure 13B:
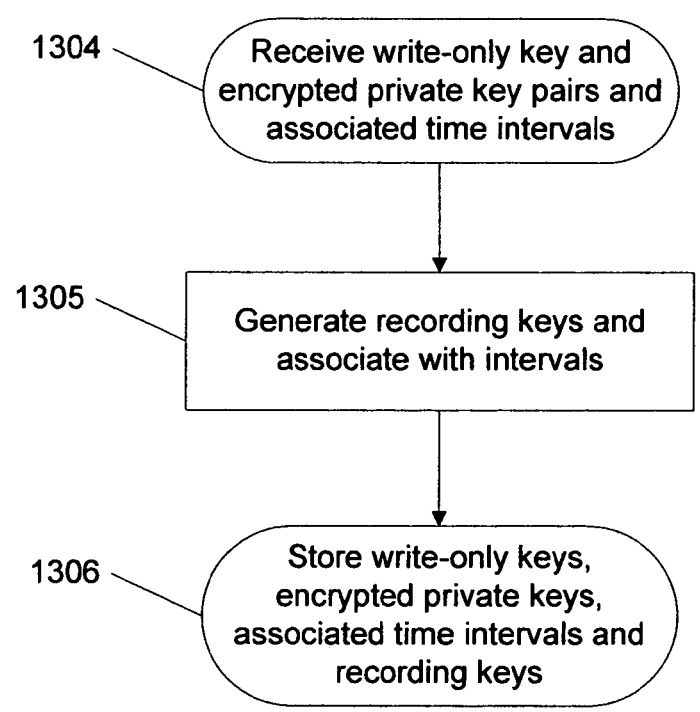
FIG. 13B is a flow diagram of a method for receiving a series of write-only keys, according to some embodiments.

FIG. 13B is a flow diagram of a method for receiving a series of write-only keys, according to some embodiments. In this example, write-only keys, corresponding encrypted private keys, and associated time intervals may be received (2504). An example of receiving write-only keys, corresponding encrypted private keys and associated time intervals is to receive them over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, the write-only keys, corresponding encrypted private keys and associated time intervals may have been transmitted as described in conjunction with FIG. 12B.

In some embodiments, recording keys may be generated and associated with time intervals (1305). An example of generating recording keys is to generate keys for a symmetric cipher such as DES, Triple-DES, AES or Blowfish, wherein keys used by the symmetric cipher are stored. Recording keys may be generated from a password, for example by receiving a password (for example from a user) and generating a key using a hash such as SHA1 or MD5 and/or a cipher, for example a stream cipher such as RC4. In some embodiments, recording keys may be generated implicitly, for example by using predetermined recording keys. The write-only keys, corresponding encrypted private keys, associated time intervals and optional recording keys may be stored (1306), for example on a flash memory, optical media or magnetic recording device recording device. In some embodiments, the techniques of this FIG. 13B may be performed by an event recording device such as a vehicular "black box."

Figure 14:
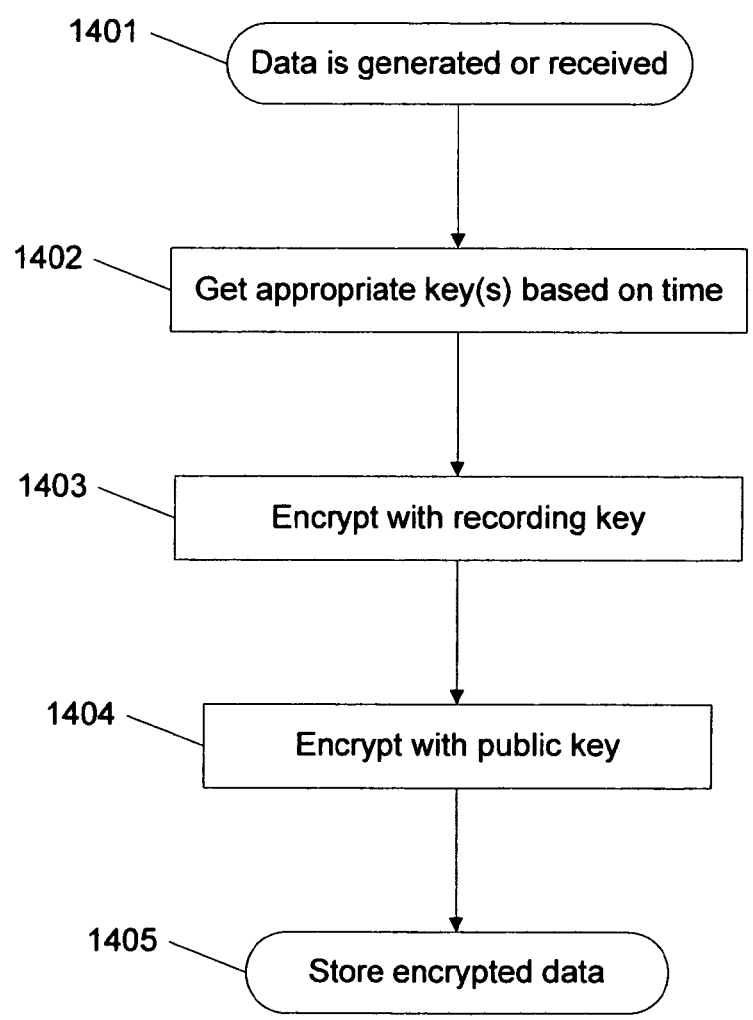
FIG. 14 is a flow diagram of a method for encrypting data using a series of write-only keys, according to some embodiments.

FIG. 14 is a flow diagram of a method for encrypting data using a series of write-only keys, according to some embodiments. In this example, data may be generated or received (1401). An example of generating data is to capture an image using a CCD and optionally filter, transform and/or compress the image, for example using an image compression technique such as JPEG. Another example of generating data is to capture periodic readings of instrumentation. Another example of generating data is to capture output from a program running on a computing device. An example of receiving data is to receive data over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication.

An appropriate key may be obtained based on the time of encrypting, or of the generation or receipt of the data (1402). An example of selecting an appropriate key is to check a time against a series of stored time intervals, find an interval that includes the time, and select a key associated with the interval. In this example, a public key associated with a matching time interval may be selected for encrypting. In some embodiments, data may be encrypted with an associated recording key, for example by using a symmetric cipher such as DES, Triple-DES, AES or Blowfish (1403). In some embodiments, a recording key may have been generated as discussed in conjunction with FIG. 13A or 13B.

Data may be encrypted using a public key associated with a matching time interval (1404). In some embodiments, metadata may be associated with encrypted data ranges, for example including a timestamp corresponding to the time data was generated or received, or a reference number corresponding to the key with which it was encrypted or may be decrypted. Encrypted data may be stored (1405), for example on a flash memory, optical media or magnetic recording device recording device. A technique such as that exemplified in this FIG. 14 may be applied to write-only keys with associated time intervals, for example keys received by techniques such as those illustrated in FIGS.

13A and 13B. In some embodiments, the method of this FIG. 14 may be performed by an event recording device such as a vehicular "black box."

Figure 15A:
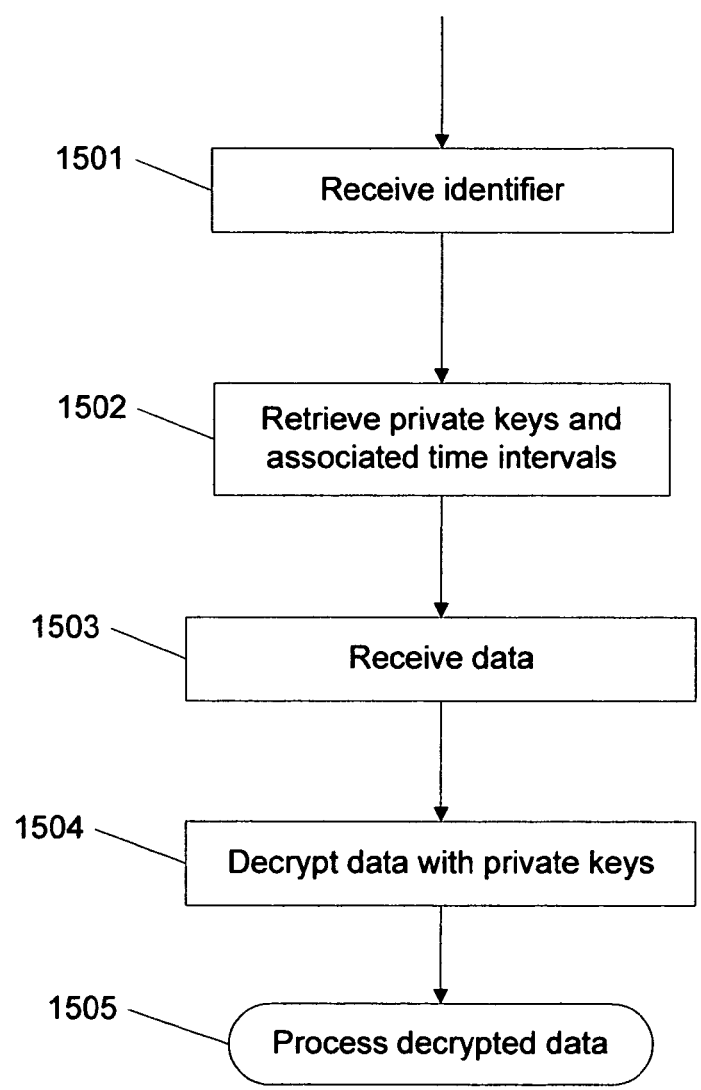
FIG. 15A is a flow diagram of a method for decrypting data received from a write-only data source, according to some embodiments.

FIG. 15A is a flow diagram of a method for decrypting data received from a write-only data source, according to some embodiments. An example of a write-only data source is an event recording device such as a vehicular "black box." In this example, an optional identifier may be received (1501). An example of receiving an identifier is to receive it over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, the identifier may be transmitted implicitly, for example by the use of a client authentication certificate while establishing an SSL connection.

Private keys and associated time intervals associated with the identifier may be retrieved (1502). Private keys and associated time intervals may, for example, have been stored as described in conjunction with FIG. 12A. Encrypted data may be received (1503). In some embodiments, encrypted data may have been encrypted as described in conjunction with FIG. 14.

Encrypted data may be decrypted with one or more appropriate private keys (1504). One or more ranges of data may be decrypted with different private keys. An appropriate private key for a range of data may for example be specified by metadata, or may be obtained based on a time associated with the generation or encrypting of the data. An example of selecting an appropriate key for a range of data is to check a time associated with the range of data against a series of stored time intervals, find an interval that includes the time, and select a key associated with the interval. In this example, a private key associated with a matching time interval may be selected for decrypting each range of data for which a different private key is appropriate. The data may be processed (1505). Examples of processing data include storing the data, transmitting the data, processing and/or printing images represented by the data, and presenting the data, for example on a display device such as a monitor or embedded display.

Figure 15B:
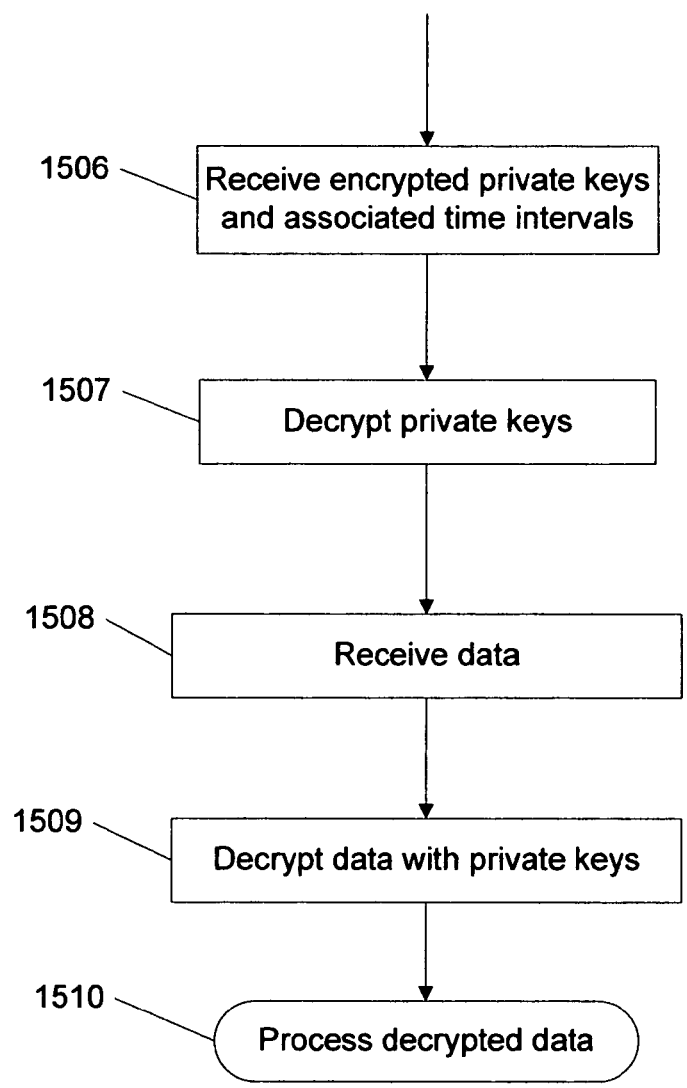
FIG. 15B is a flow diagram of a method for decrypting data received from a write-only data source, according to some embodiments.

FIG. 15B is a flow diagram of a method for decrypting data received from a write-only data source, according to some embodiments. An example of a write-only data source is an event recording device such as a vehicular "black box." In this example, encrypted private keys and associated time intervals may be received (1506). An example of receiving encrypted private keys and associated time intervals is to receive them over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication.

The private keys may be decrypted (1507). An example of decrypting private keys is to decrypt them with a symmetric cipher such as DES, Triple-DES, AES or Blowfish, wherein the key used by the symmetric cipher is stored. For example, the stored key may be the key used to encrypt the private keys such as was described in conjunction with FIG. 12B. Encrypted data may be received (1508). In some embodiments, encrypted data may have been encrypted as described in conjunction with FIG. 14.

Encrypted data may be decrypted with one or more appropriate private keys (1509). One or more ranges of data may be decrypted with different private keys. An appropriate private key for a range of data may for example be specified by metadata, or may be obtained based on a time associated with the generation or encrypting of the data. An example of selecting an appropriate key for a range of data is to check a time associated with the range of data against a series of stored time intervals, find an interval that includes the time, and select a key associated with the interval. In this example, a private key associated with a matching time interval may be selected for decrypting each range of data for which a different private key is appropriate. The data may be processed (1510). Examples of processing data include storing the data, transmitting the data, processing and/or printing images represented by the data, and presenting the data, for example on a display device such as a monitor or embedded display.

Figure 16A:
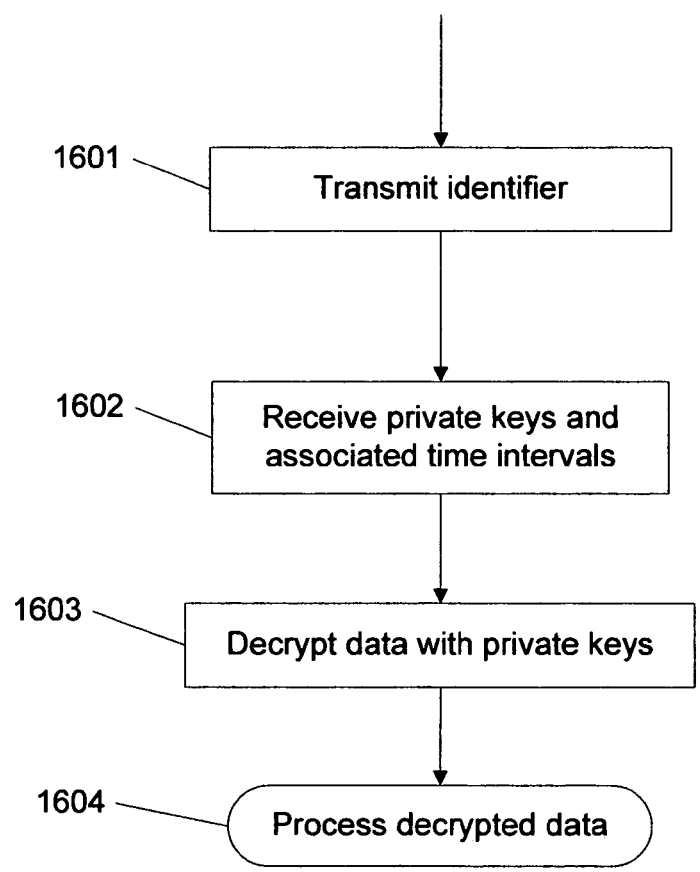
FIG. 16A is a flow diagram of a method for receiving reading keys at a write-only data source, according to some embodiments.

FIG. 16A is a flow diagram of a method for receiving reading keys at a write-only data source, according to some embodiments. In this example, an identifier may optionally be transmitted (1601). An example of transmitting an identifier is to transmit it over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, an identifier may have been received as discussed in conjunction with FIG. 13A. In some embodiments, the identifier may be transmitted implicitly, for example by the use of a client authentication certificate while establishing an SSL connection.

Private keys and associated time intervals associated with the identifier may be received (1602). Encrypted data may be decrypted with one or more appropriate private keys (1603). In some embodiments, encrypted data may have been encrypted as described in conjunction with FIG. 14. One or more ranges of data may be decrypted with different private keys. An appropriate private key for a range of data may for example be specified by metadata, or may be obtained based on a time associated with the generation or encrypting of the data. An example of selecting an appropriate key for a range of data is to check a time associated with the range of data against a series of stored time intervals, find an interval that includes the time, and select a key associated with the interval. In this example, a private key associated with a matching time interval may be selected for decrypting each range of data for which a different private key is appropriate.

The data may be processed (1604). Examples of processing data include storing the data, transmitting the data, processing and/or printing images represented by the data, and presenting the data, for example on a display device such as a monitor or embedded display. In some embodiments, a device performing this technique may be an event recording device such as a vehicular "black box."

Figure 16B:
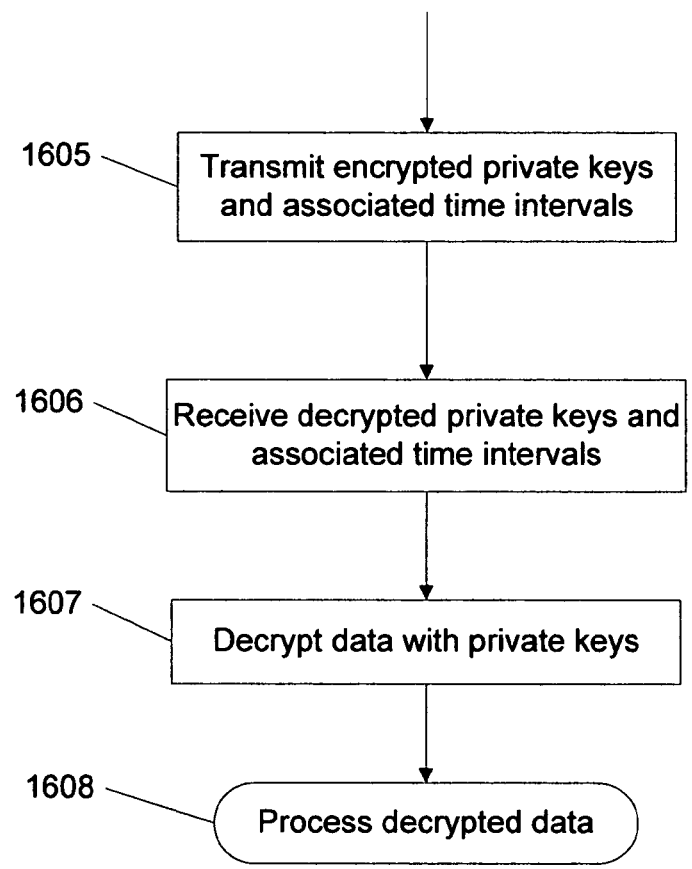
FIG. 16B is a flow diagram of a method for receiving reading keys at a write-only data source, according to some embodiments.

FIG. 16B is a flow diagram of a method for receiving reading keys at a write-only data source, according to some embodiments. In this example, encrypted private keys and optionally associated time intervals may be transmitted (1605). An example of transmitting encrypted private keys and optional associated time intervals is to transmit them over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, encrypted private keys and associated time intervals may have been received as discussed in conjunction with FIG. 13B.

Decrypted private keys and associated time intervals may be received (1606). Encrypted data may be decrypted with one or more appropriate private keys (1607). In some embodiments, encrypted data may have been encrypted as described in conjunction with FIG. 14. One or more ranges of data may be decrypted with different private keys. An appropriate private key for a range of data may for example be specified by metadata, or may be obtained based on a time associated with the generation or encrypting of the data. An example of selecting an appropriate key for a range of data is to check a time associated with the range of data against a series of stored time intervals, find an interval that includes the time, and selecting a key associated with the interval. In this example, a private key associated with a matching time interval may be selected for decrypting each range of data for which a different private key is appropriate.

The data may be processed (1608). Examples of processing data include storing the data, transmitting the data, processing and/or printing images represented by the data, and presenting the data, for example on a display device such as a monitor or embedded display. In some embodiments, a device performing this technique may be an event recording device such as a vehicular "black box."

Figure 17A:
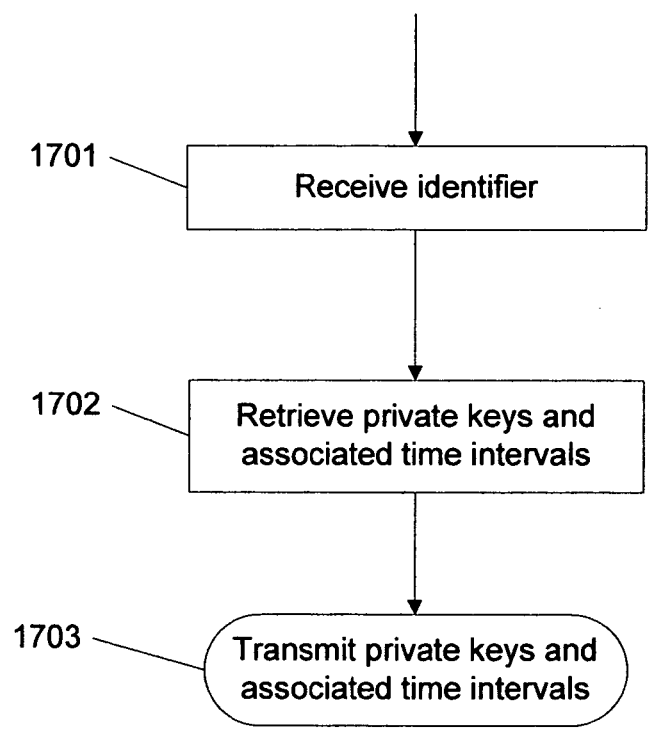
FIG. 17A is a flow diagram of a method for transmitting reading keys to a write-only data source, according to some embodiments.

FIG. 17A is a flow diagram of a method for transmitting reading keys to a write-only data source, according to some embodiments. In this example, an identifier may optionally be received (1701). An example of receiving an identifier is to receive it over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, the identifier may be transmitted implicitly, for example by the use of a client authentication certificate while establishing an SSL connection. In some embodiments, the optional identifier may have been transmitted as described in conjunction with FIG. 16A.

Private keys and associated time intervals associated with the identifier may be retrieved (1702). Private keys and associated time intervals may, for example, have been stored as described in conjunction with FIG. 12A. Private keys and associated time intervals may be transmitted (1703). An example of transmitting private keys and associated time intervals is to transmit them over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, the recipient of private keys and associated time intervals may be an event recorder such as a vehicular "black box."

Figure 17B:
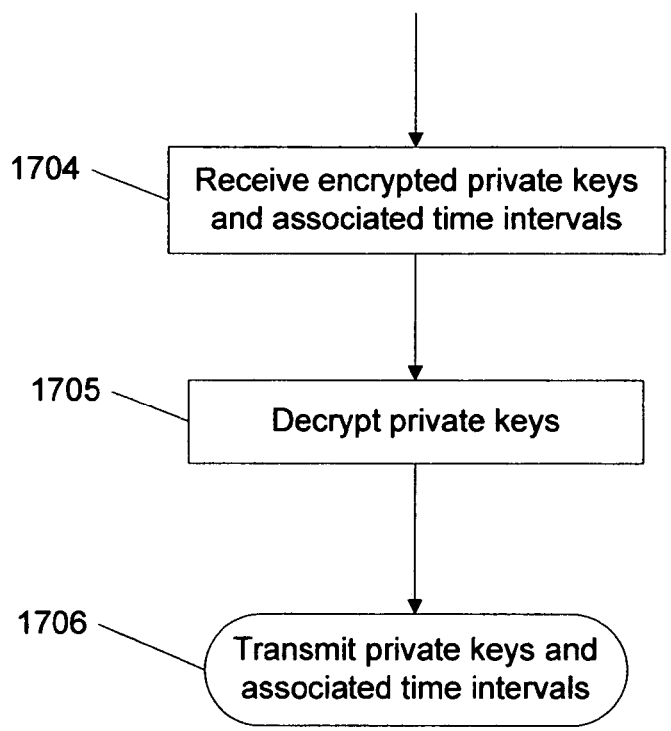
FIG. 17B is a flow diagram of a method for transmitting reading keys to a write-only data source, according to some embodiments.

FIG. 17B is a flow diagram of a method for transmitting reading keys to a write-only data source, according to some embodiments. In this example, encrypted private keys and optionally associated time intervals may be received (1704). An example of receiving encrypted private keys and associated time intervals is to receive them over a network such as the internet, an intranet, a point-to-point connection such as a USB, FireWire, serial or parallel connection, or a wireless network such as 802.11 or Bluetooth. In some embodiments, a network connection may be encrypted and/or or authenticated, for example using SSL with client authentication. In some embodiments, the encrypted private keys and optional associated time intervals may have been transmitted as described in conjunction with FIG. 16B.

The private keys may be decrypted (1705). An example of decrypting private keys is to decrypt them with a symmetric cipher such as DES, Triple-DES, AES or Blowfish, wherein the key used by the symmetric cipher is stored. For example, the stored key may be the escrow key used to encrypt the private keys, for example as described in conjunction with FIG. 12B. Private keys and optionally associated time intervals may be transmitted (1706). An example of transmitting private keys and associated time intervals is to transmit them over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, the recipient of private keys and associated time intervals may be an event recorder such as a vehicular "black box."

Figure 18:
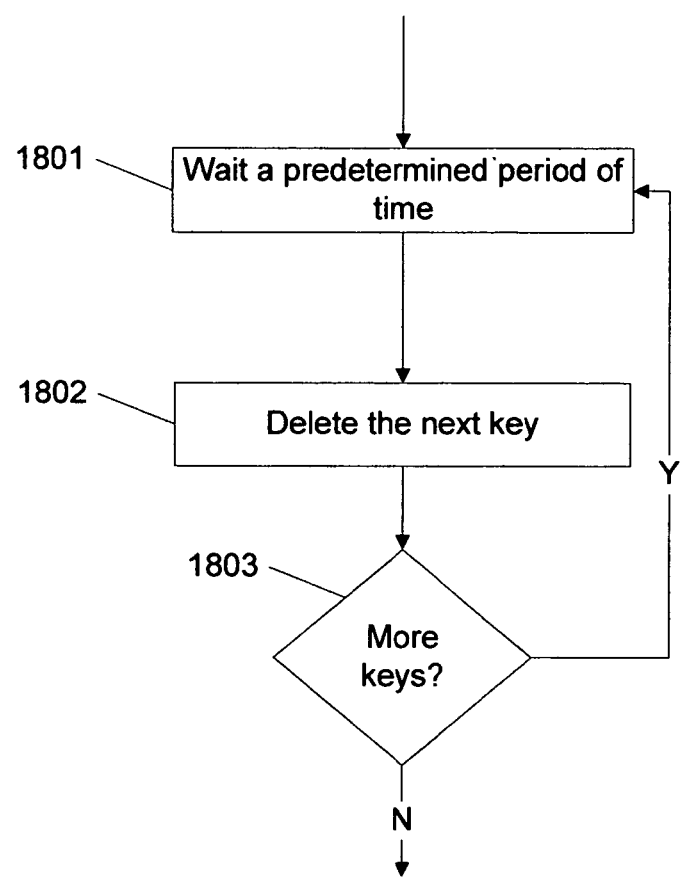
FIG. 18 is a flow diagram of a method for automatically remotely deleting data, according to some embodiments.

FIG. 18 is a flow diagram of a method for automatically remotely deleting data, according to some embodiments. In some embodiments, data being remotely deleted may have been generated as discussed in conjunction with FIG. 14. In this example, a predetermined period of time may be waited (1801). One example of a predetermined period of time is a fixed duration, for example one day. Another example of a predetermined period of time is a time interval, for example one week, added to a time associated with an interval associated with the next stored private key in a sequence. In some embodiments, keys in a sequence may be private keys, for example private keys generated as discussed in conjunction with FIG. 12A or 12B. In other embodiments, keys in a sequence may be recording keys, for example recording keys generated as discussed in conjunction with FIG. 13A or 13B. The next key in a sequence may be deleted (1802). For example, memory used to store the key may be overwritten with a predetermined pattern. If it is determined that there are more keys in the sequence (1803), then the process continues with the next key in the sequence in this example (1801).

Figure 19:
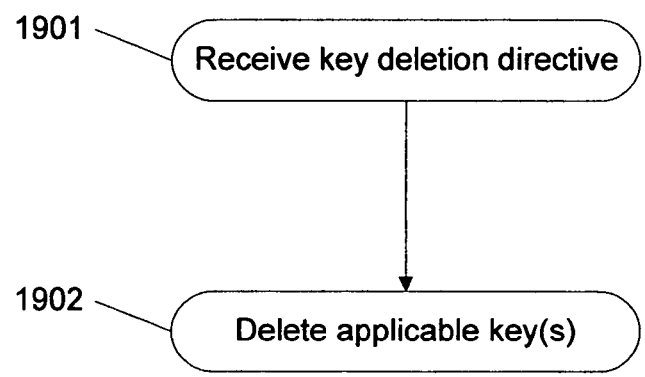
FIG. 19 is a flow diagram of a method for remotely deleting data, according to some embodiments.

FIG. 19 is a flow diagram of a method for remotely deleting data, according to some embodiments. In some embodiments, data being remotely deleted may have been generated as discussed in conjunction with FIG. 14. In this example, a directive may be received to delete one or more stored private keys (1901). An example of receiving a directive to delete one or more stored keys is to receive it over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, a stored key may be a private key, for example a private key generated as discussed in conjunction with FIG. 12A or 12B. In other embodiments, a stored key may be a recording key, for example a recording key generated as discussed in conjunction with FIG. 13A or 13B. A directive may include a designation of one or more keys to delete, and/or a designation of a time interval for which corresponding key(s) should be deleted. When a directive is received, the specified private key(s) are deleted in this example (1902).

Figure 20:
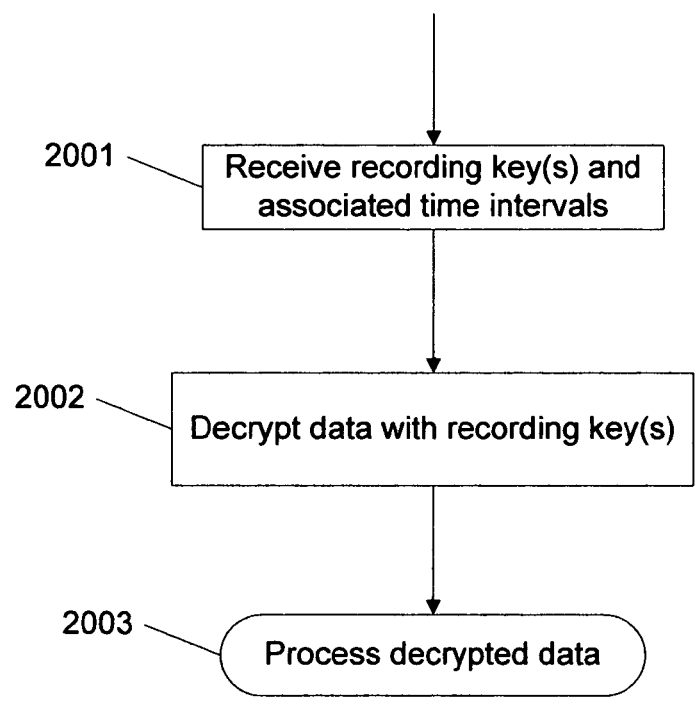
FIG. 20 is a flow diagram of a method for decrypting data with multiparty cooperation, according to some embodiments.

FIG. 20 is a flow diagram of a method for decrypting data with multiparty cooperation, according to some embodiments. In this example, one or more recording keys and associated time intervals may be received (2001). Encrypted data may be decrypted with the appropriate recording key(s) (2002). In some embodiments, the encrypted data may have been generated as described in conjunction with FIG. 14 and partially decrypted as discussed in conjunction with FIGS. 15A and/or 15B. One or more ranges of data may be decrypted with different recording keys. An appropriate recording key for a range of data may for example be specified by metadata, or may be obtained based on a time associated with the generation or encrypting of the data. An example of selecting an appropriate recording key for a range of data is to check a time associated with the range of data against a series of stored time intervals, find an interval that includes the time, and select a key associated with the interval. In this example, a recording key associated with a matching time interval may be selected for decrypting each range of data for which a different recording key is appropriate. The decrypted data may be processed (2003). Examples of processing data include storing the data, transmitting the data, processing and/or printing images represented by the data, and presenting the data, for example on a display device such as a monitor or embedded display.

Figure 21:
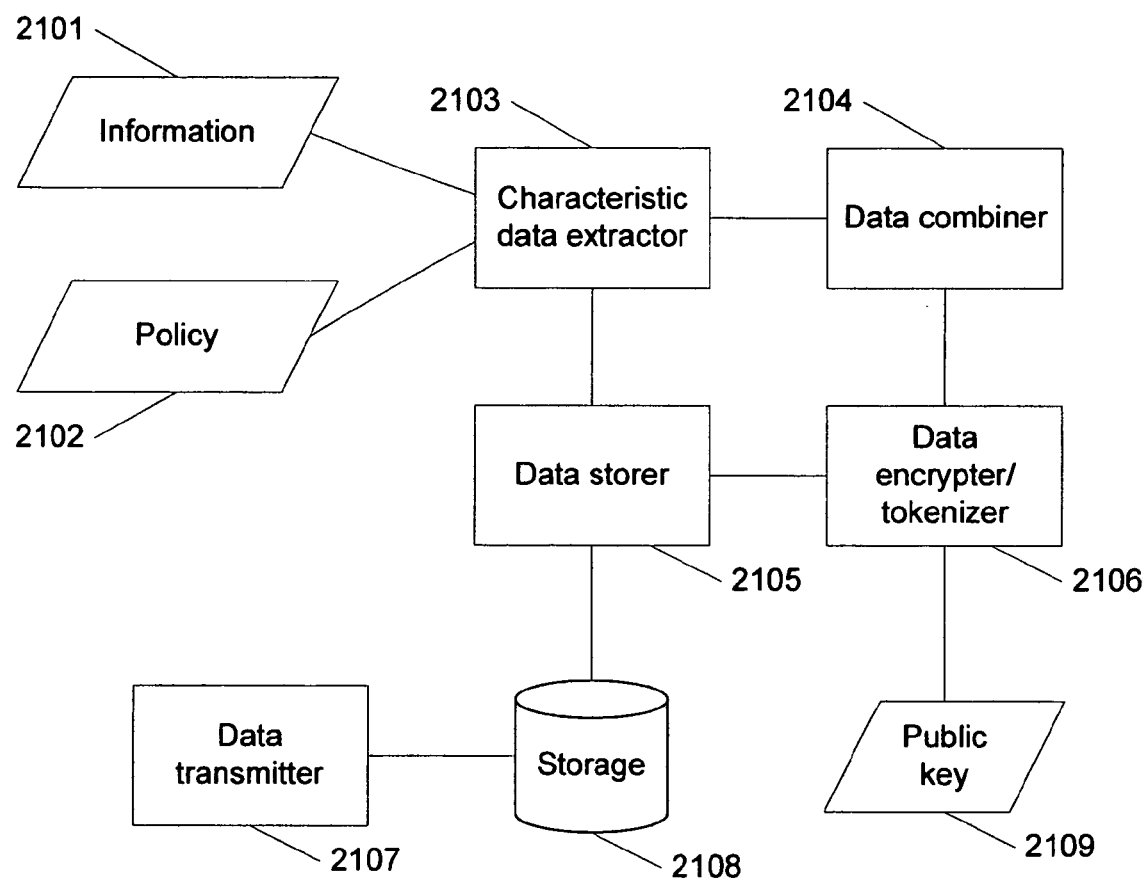
FIG. 21 is a diagram of a system for generating unreadable information associated with one or more policies, according to some embodiments.

FIG. 21 is a diagram of a system for generating unreadable information associated with one or more policies, according to some embodiments. In this example, information 2101 may include sensitive information such as a credit card number, bank account number, social security number, driver's license number, and/or name and/or address information. A policy 2102 may be any limitation on the use of such information, such as a limitation on the potential user(s) of the information 2101, acceptable times or amounts of use, or other limitations. Examples of policies are discussed in conjunction with FIG. 24. In some embodiments, a policy 2102 may be formatted, for example in XML according to a predetermined schema, which may for example be defined in a document type definition (DTD).

The information 2101 and optionally the one or more policies 2102 may be provided to a characteristic data extractor 2103. The characteristic data extractor 2103 may extract information characteristic of the information 2101, for example the last several digits, such as four, of a social security number, credit card number, or bank account number, or an initial of a name, or a street address number or zip code, and/or a credit card expiration date. A data combiner 2104 may combine the information 2101 and the policy or policies 2102, for example by concatenating them into a predetermined data format.

In some embodiments, a data encrypter 2106 may encrypt the combined data using a cryptographic key 2109, which may for example be a public key for which no corresponding private key is known to the data encrypter 2106 and the other components of this FIG. 21. In some embodiments, a data encrypter may encrypt the combined data using an asymmetric cryptosystem such as a public key cryptosystem, for example RSA or El Gamal. In other embodiments, a data tokenizer 2106 may create a token associated with the information 2101 and the policy 2102, which in some embodiments may include communicating with an external entity such as a data consumer 104 of FIG. 1. A token refers herein to any data that may be used to refer to sensitive information and one or more associated policies, without literally containing the sensitive information and/or associated policies. An example of a token is data compatible with the same format as the sensitive information, such as data consistent with a credit card number being used in place of an actual credit card number and associated policy or policies.

A data storer 2105 may store the combined encrypted or tokenized data in storage 2108. Storage 2108 may be any form of storage, including volatile storage such as random-access memory, or nonvolatile storage such as flash memory, magnetic memory or optical memory. A data transmitter 2107 may transmit stored encrypted or tokenized data from storage 2108, for example as part of a request for a transaction over a network such as network 102 of FIG. 1.

In some embodiments, the components shown in this FIG. 21 may be contained on a single entity, such as data server 103 of FIG. 1. In some embodiments, components shown in this FIG. 21 may be contained across more than one entity. In one example of separated components, the characteristic data extractor 2103, data combiner 2104 and data encrypter 2106 may be associated with a data generator such as data generator 101 of FIG. 1, such as a user-operated computer, and the data storer 2105, storage 2108 and data transmitter 2107 may be associated with a data server such as data server 103 of FIG. 1.

In another example of separated components, the data combiner 2104 and data encrypter 2106 may be associated with a data generator such as data generator 101 of FIG. 1, such as a user-operated computer; the data storer 2105, storage 2108 and data transmitter 2107 may be associated with a data server such as data server 103 of FIG. 1; and the characteristic data extractor 2103 may be associated with a server associated with an authority such as a bank or payment processor, for example a data consumer such as data consumer 104 of FIG. 1.

Figure 26:
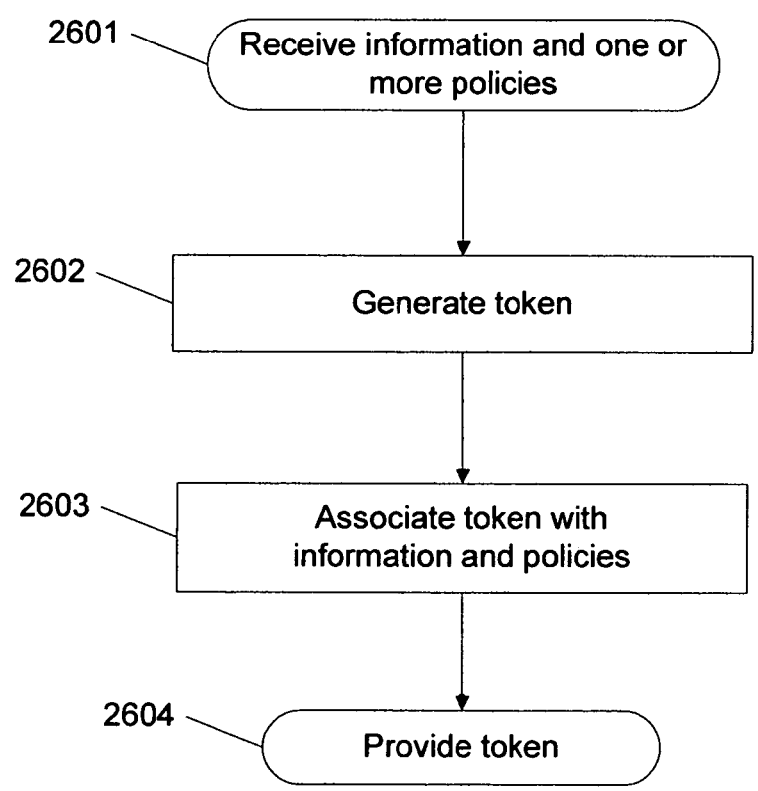
FIG. 26 is a flow diagram of a method for tokenizing information and one or more policies, according to some embodiments.

In another example of separated components, the tokenizer 2106 may be associated with an authority such as a bank or payment processor, for example a data consumer such as data consumer 104 of FIG. 1, which may for example perform tokenization as described in conjunction with FIG. 26, while some or all other components may be associated with a data generator such as data generator 101 of FIG. 1 and/or a data server such as data server 103 of FIG. 1.

Further details of the operation of the system described in this FIG. 21 are described in conjunction with FIGS. 23, 24, 25, 26, 27, and 28.

Figure 22:
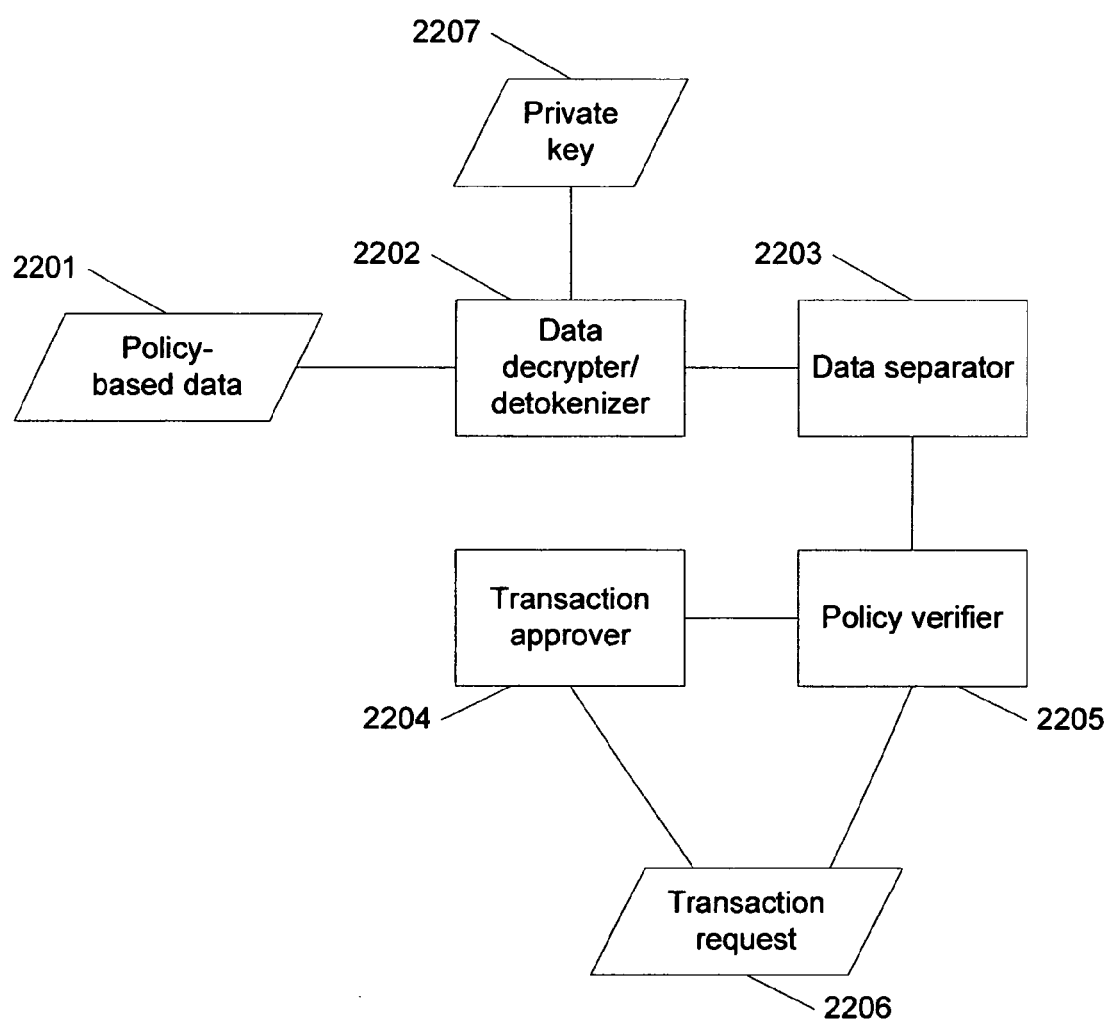
FIG. 22 is a diagram of a system for evaluating a transaction request including encoded data associated with one or more policies, according to some embodiments.

FIG. 22 is a diagram of a system for evaluating a transaction request associated with encoded data associated with one or more policies, according to some embodiments. Encoded data refers herein to encrypted and/or tokenized data. In this example, policy-based data 2201 is data that includes one or more policies and has been encrypted or tokenized, for example as described in conjunction with FIGS. 21, 23, 24, 25, 26 and 27. In some embodiments, a data decrypter 2202 may decrypt the policy-based data 2201 using a key 2207, which may be a public key. A data decrypter 2202 may use an asymmetric cryptosystem, for example a public key cryptosystem such as RSA or El Gamal. The decryption key 2207 may be the private half of a public/private key pair, in which the public half of the key pair is public key 2109 of FIG. 21. In some embodiments, a data detokenizer 302 may retrieve information and an associated policy from tokenized policy-based data 2201, for example by looking up the policy-based token 2201 in a database such as a relational database and retrieving associated information and one or more policies.

A data separator 2203 may separate one or more policies from other information such as a bank account number, credit card number, social security number, driver's license number, name and/or address. A policy verifier 2205 may check the policy or policies and optionally a transaction request 2206 to determine whether the policy or policies is being conformed with. Examples of determining policy conformance are discussed in conjunction with 3003 of FIG. 30. Examples of a transaction request include a request to charge a credit or debit card, or withdraw or transfer money from a bank account. A transaction approver 2204 may evaluate the transaction request 2206 and optionally the policy or policies and/or other information separated out of the policy-based data 2201, and may determine whether to approve the transaction request 2206, for example including determining available funds or credit, and/or a risk assessment associated with the requested transaction. Subsequent performance of the transaction may include using information separated out of the policy-based data 2201 by the data separator 2203.

Examples of further details of the operation of the system described in this FIG. 22 are described in conjunction with FIGS. 23, 29, 30 and 26.

Figure 23:
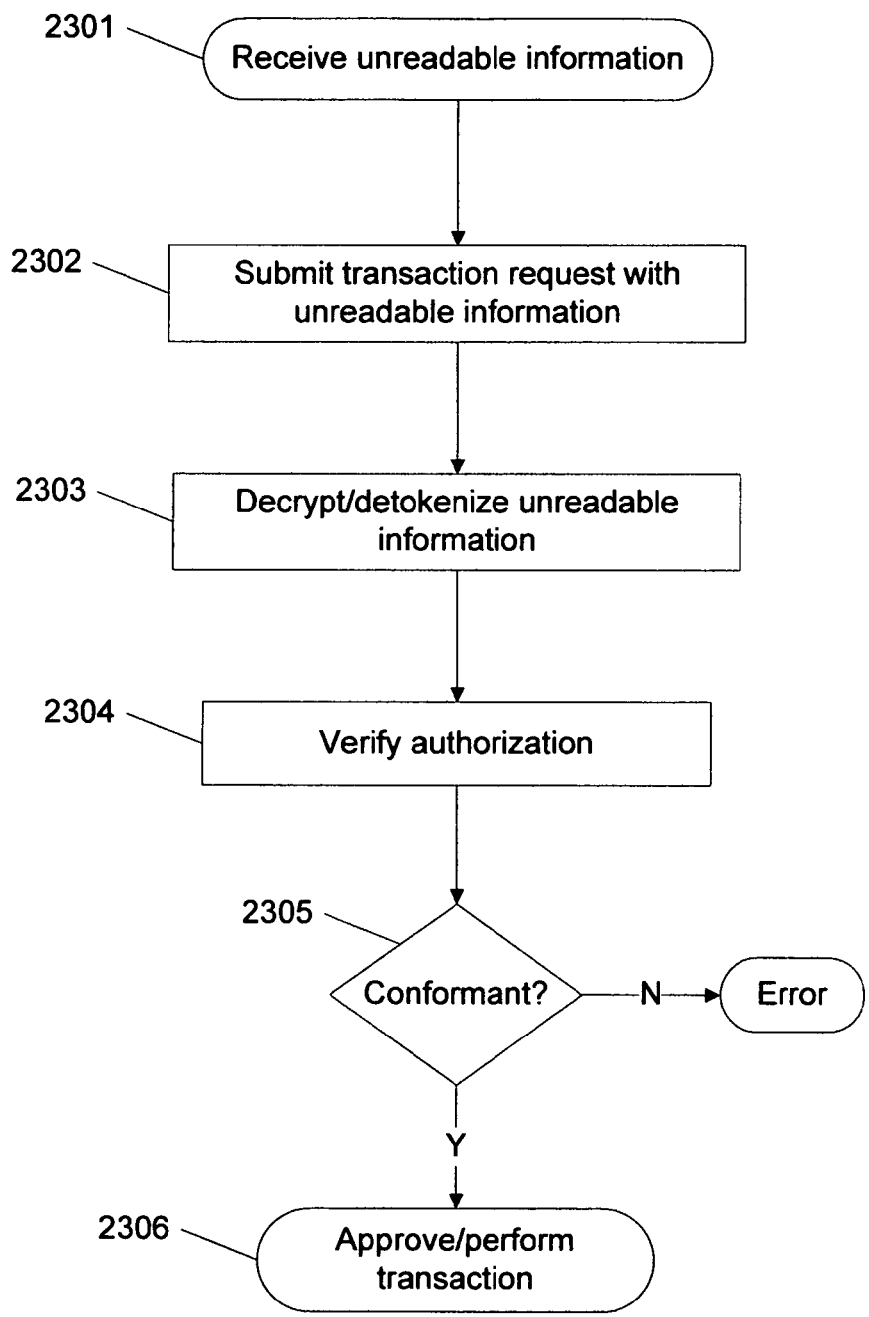
FIG. 23 is a flow diagram of a method for using unreadable information to determine whether to perform a transaction, according to some embodiments.

FIG. 23 is a flow diagram of a method for using unreadable information to determine whether to perform a transaction, according to some embodiments. In some embodiments illustrated by the following figures, unreadable information may refer herein inclusively to tokenized information, for example information that has been tokenized as described in conjunction with FIG. 26. In this example, unreadable information may be received (2301), for example including information relating to a transaction such as a credit card number or bank account number. A transaction request may be submitted including the unreadable information (2302).

A recipient of the transaction request, or an authority acting on the recipient's behalf, may decrypt or detokenize the encrypted or tokenized, previously unreadable information (2303). An example of decrypting the encrypted information is to decrypt it using a private key, for example using an asymmetric cryptosystem such as RSA or El Gamal. An example of detokenizing the unreadable information is discussed in conjunction with FIG. 26. Authorization for the transaction may be checked (2304), for example by checking whether the identity of the requesting party is the same as an identity contained within the decrypted or detokenized information, and/or checking conformance with one or more other extracted policies. In some embodiments, the requesting party may be a vendor, which may for example request via a data server such as data server 103 of FIG. 1. If the transaction is determined to conform to the policy or policies (2305), then the requested transaction is approved and/or performed in this example (2306).

Figure 24:
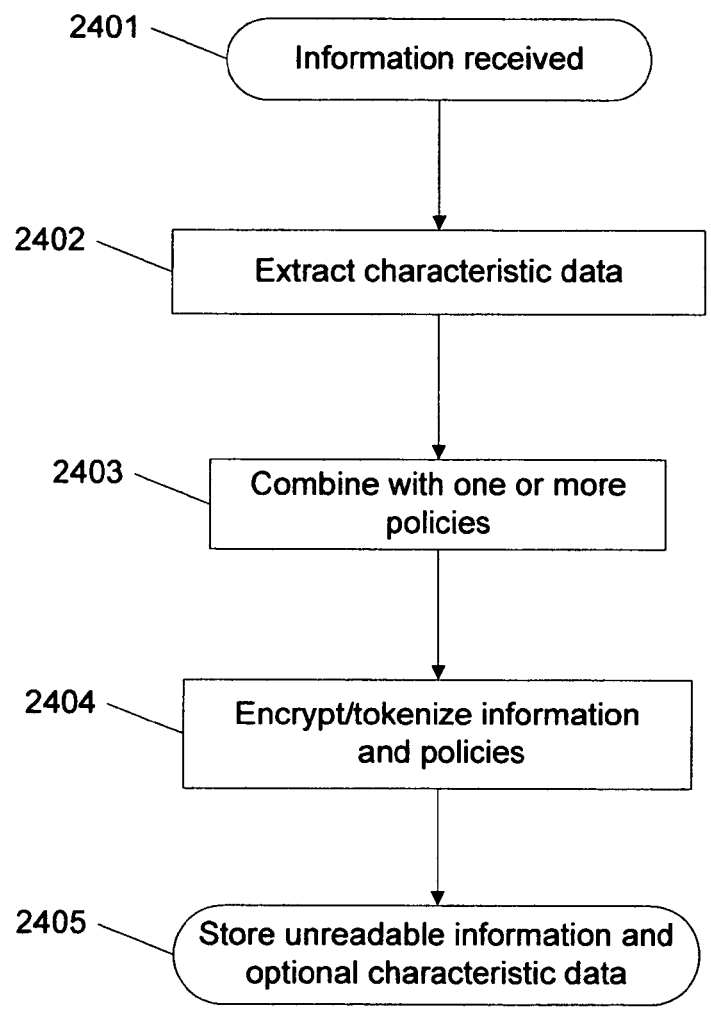
FIG. 24 is a flow diagram of a method for unreadably storing sensitive information with one or more policies, according to some embodiments.

FIG. 24 is a flow diagram of a method for unreadably storing sensitive information with one or more policies, according to some embodiments. In this example, information may be received (2401). An example of receiving information is for a user to type data into a web form. Information may, for example, be received over a network such as the internet, an intranet, a point-to-point connection such as a USB, FireWire, serial or parallel connection, or a wireless network such as 802.11 or Bluetooth. In some embodiments, a network connection may be encrypted and/or authenticated, for example using SSL with client authentication. In some embodiments, information may include sensitive information, such as credit card numbers, social security numbers or bank account numbers.

Characteristic data may optionally be extracted (2402). In one example, a partial credit card number, such as the last four digits of a credit card number, may be extracted. In another example, a partial social security number, such as the last four digits of a social security number, may be extracted. In yet another example, partial name or address information, such as one or more initials and/or a zip code, may be extracted. The information may be combined with one or more policies (2403). A policy refers herein to any condition that may be checked to determine whether a request such as a transaction is conformant. A policy, as used herein, is a generalized policy, i.e. is not intrinsically specific to a single request or transaction. An example of a policy is a vendor ID identifying one or more vendors that are authorized to use the information. A vendor ID refers herein to an identifier that is used to identify an entity or group of entities, for example an identifier used to identify an entity that is authorized to transmit unreadable information to a third party that may be able to read it, and/or authorized to request transactions using the encoded information. Another example of a policy is a limit on the dollar amount of a single transaction. Yet another example of a policy is a limit on the aggregate amount of all transactions. Yet another example of a policy is a limit on the aggregate amount of all transactions in a particular time span, for example a month. Yet another example of a policy is an expiration date, after which the information is not authorized to be used. Yet another example of a policy is a number of permitted transactions, for example one. Yet another example of a policy is a restriction on the nature of an allowed use involving the encoded data. For example, a policy may include restriction on the use of an encoded social security number for use only by one or more employers or financial institutions, and/or only to report income. As another example, a policy may include a restriction on the use of an encoded social security number for use only as part of a credit check with a credit reporting agency.

The information and policy or policies may be encrypted or tokenized (2404). One example of encrypting the information and policies is to encrypt them with a public key, for example, a public key belonging to a third party, to which the party performing the encryption does not have a corresponding private key. Another example of encrypting the information and policies is to transmit them to an authority, who may encrypt them, for example using a symmetric cipher such as DES, Triple-DES, AES or Blowfish with a secret key. An example of tokenizing the information and policies is to transmit them to an authority, which may for example perform tokenization as described in conjunction with FIG. 26, and receive a token.

The unreadable (encrypted or tokenized) information and optional associated characteristic data may be stored (2405). An example of storing the unreadable information and optional associated characteristic data is to store it in a file or database, for example on a nonvolatile medium such as magnetic media, optical media or flash memory. In some embodiments, unreadable information and optional characteristic data may be associated with customer account information, for example in a database such as a relational database. In some embodiments, the method of this FIG. 24 may be performed by an entity that is authorized to transact with the party that provided the data, for example an e-commerce company or other institution authorized to make charges, which may in some embodiments be a data server 103 of FIG. 1.

Figure 25:
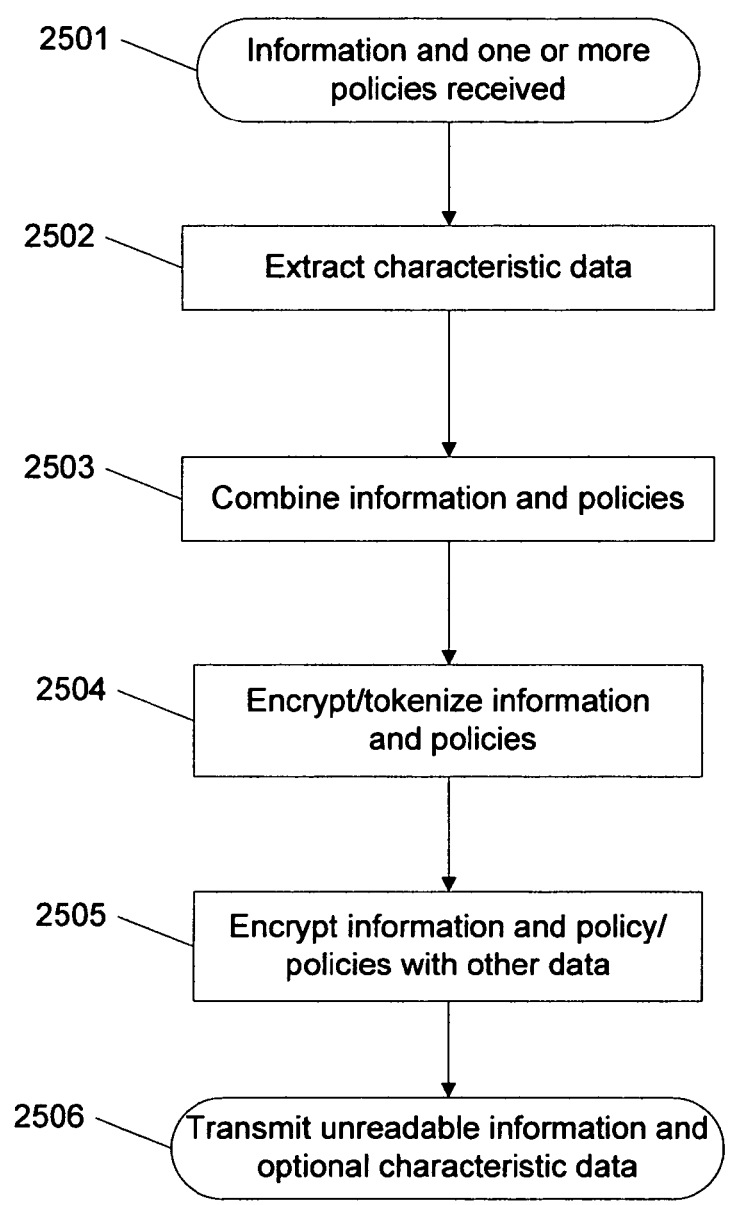
FIG. 25 is a flow diagram of a method for encapsulating sensitive data with one or more policies, according to some embodiments.

FIG. 25 is a flow diagram of a method for encapsulating sensitive data with one or more policies, according to some embodiments. In this example, information and one or more policies may be received (2501). Examples of policies are discussed in conjunction with FIG. 24. An example of receiving information and one or more policies is for a user to type data into a form such as web form, in which one or more policies may be included, for example as a hidden field, or may be selected or specified by a user. In some embodiments, information may be received over a network such as the internet, an intranet, a point-to-point connection such as a USB, FireWire, serial or parallel connection, or a wireless network such as 802.11 or Bluetooth. In some embodiments, a network connection may be encrypted and/ or authenticated, for example using SSL with client authentication. In some embodiments, information may include sensitive information, such as credit card numbers or bank account numbers. In some embodiments, information and one or more policies may be transmitted to an intermediary such as a credit card company, payment processor or bank. In other embodiments, information may be entered, for example using a "trusted path" technique wherein data may be securely entered and encrypted on a computing device with which a user is interacting, for example as described in patent application Ser. No. 11/131,038, titled "Secure Data Entry" and filed May 16, 2005, which is incorporated herein by reference for all purposes. Data entry using a trusted path may, for example, include receiving a secure attention sequence and/or entering data in a reserved area. In other embodiments, data may be entered, for example via a form such as a web form, and encrypted on a computing device with which a user is interacting using application code such as a script or an ActiveX component.

Characteristic data may optionally be extracted (2502). In one example, a partial credit card number, such as the last four digits of a credit card number, may be extracted. In another example, a partial social security number, such as the last four digits of a social security number, may be extracted. In yet another example, partial name or address information, such as one or more initials and/or a zip code, may be extracted. The information may be combined with one or more policies (2503).

The information and policies may be encrypted or tokenized (2504). One example of encrypting the information and policies is to encrypt them with a public key, for example, a public key belonging to a third party, to which the party performing the encryption and/or the party to whom the information will be transmitted does not have a corresponding private key. Another example of encrypting the information and policies is to transmit them to an authority, who may encrypt them, for example using a symmetric cipher such as DES, Triple-DES, AES or Blowfish with a secret key. An example of tokenizing the information and policies is to transmit them to an authority, which may for example perform tokenization as described in conjunction with FIG. 26, and receive a token.

In some embodiments, the encrypted or tokenized information may be combined with additional data and re-encrypted (2505), for example using a public key associated with trusted path data entry. The unreadable (encrypted or tokenized) information and optional associated characteristic data may be transmitted (2506). An example of transmitting encrypted or tokenized information and optional characteristic data is to send it, optionally encrypted along with other data, from a machine with which a user is interacting (for example a data generator such as data generator 101 of FIG. 1) to an entity that is authorized to transact with the party that provided the data, for example an e-commerce company or other institution authorized to make charges, which may in some embodiments be a data server 103 of FIG. 1. Another example of transmitting encrypted or tokenized information and optional characteristic data is to send it from a machine such as a server belonging to a trusted third party, for example a credit card company, payment processor or bank, to an entity that is authorized to transact with the party that provided the data.

FIG. 26 is a flow diagram of a method for tokenizing information and one or more policies, according to some embodiments. In this example, sensitive information and one or more policies may be received (2601). Examples of sensitive information include a credit card number, bank account number, social security number, driver's license number, and name and/or address information. An example of receiving this data is to receive it over a network such as network 102 of FIG. 1. A token may be generated (2602). In some embodiments, a token may be generated randomly, or randomly within constraints such as consistency with limitations on data such as a checksum or data identifying a type or affiliation of a credential. In some embodiments, a token may be generated sequentially. In some embodiments, a policy may be implicit. An example of an implicit policy is a policy that only the entity making the tokenization request may be permitted to use the sensitive information.

The token may be associated with the sensitive information and one or more policies (2603). An example of associating the token with the sensitive information and one or more policies is to store all three in a row in a database table such as a table within a relational database, wherein the token may be a key. The token may be provided (2604). An example of providing the token is to transmit it to the requester, for example over a network such as network 102 of FIG. 1. In some embodiments, the method of this FIG. 26 may be performed by a data consumer 104 of FIG. 1.

Figure 27:
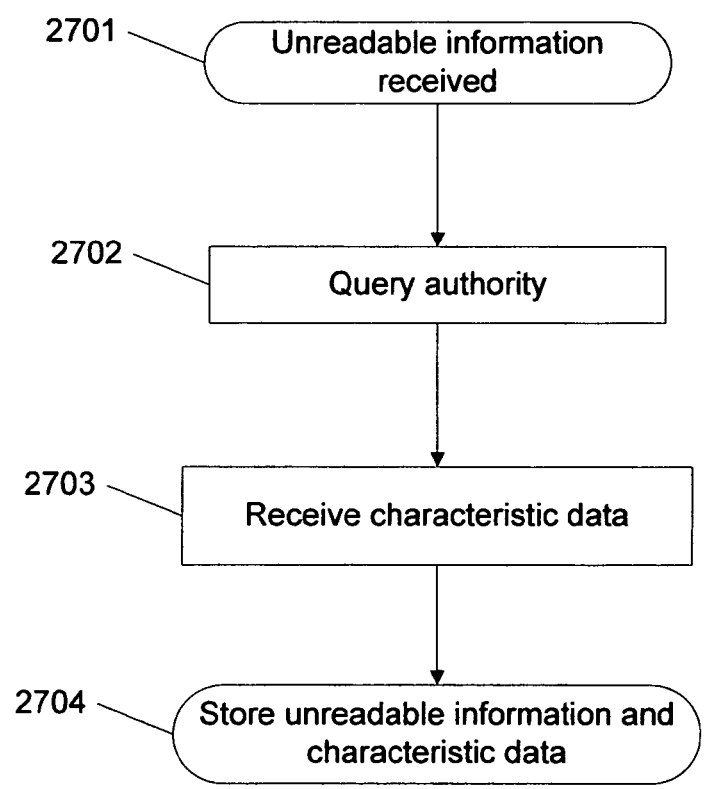
FIG. 27 is a flow diagram of a method for obtaining characteristic data from unreadable information, according to some embodiments.

FIG. 27 is a flow diagram of a method for obtaining characteristic data from unreadable information, according to some embodiments. In this example, unreadable information may be received (2701). An example of receiving unreadable information is to receive it over a network such as the internet, an intranet or extranet, or a private network. An example of unreadable information is information prepared as discussed in conjunction with FIG. 25, wherein the optional characteristic data extraction and transmittal was not performed. An authority may be queried (2702). In some embodiments, an authority may have a private key corresponding to the public key with which the information was encrypted, or a secret key with which the information was encrypted, or a translation table by which an unreadable token may be translated into associated data. An authority may, for example, be a trusted institution such as a credit card company, payment processor or bank.

Characteristic data may be received (2703). Unreadable information and characteristic data may optionally be stored (2704). An example of storing the unreadable information and associated characteristic data is to store it in a file or database, for example on a nonvolatile medium such as magnetic media, optical media or flash memory. In some embodiments, unreadable information and optional characteristic data may be associated with customer account information, for example in a database such as a relational database. In some embodiments, the party storing information may be an entity that is authorized to transact with the party that provided the data, for example an e-commerce company or other institution authorized to make charges.

Figure 28:
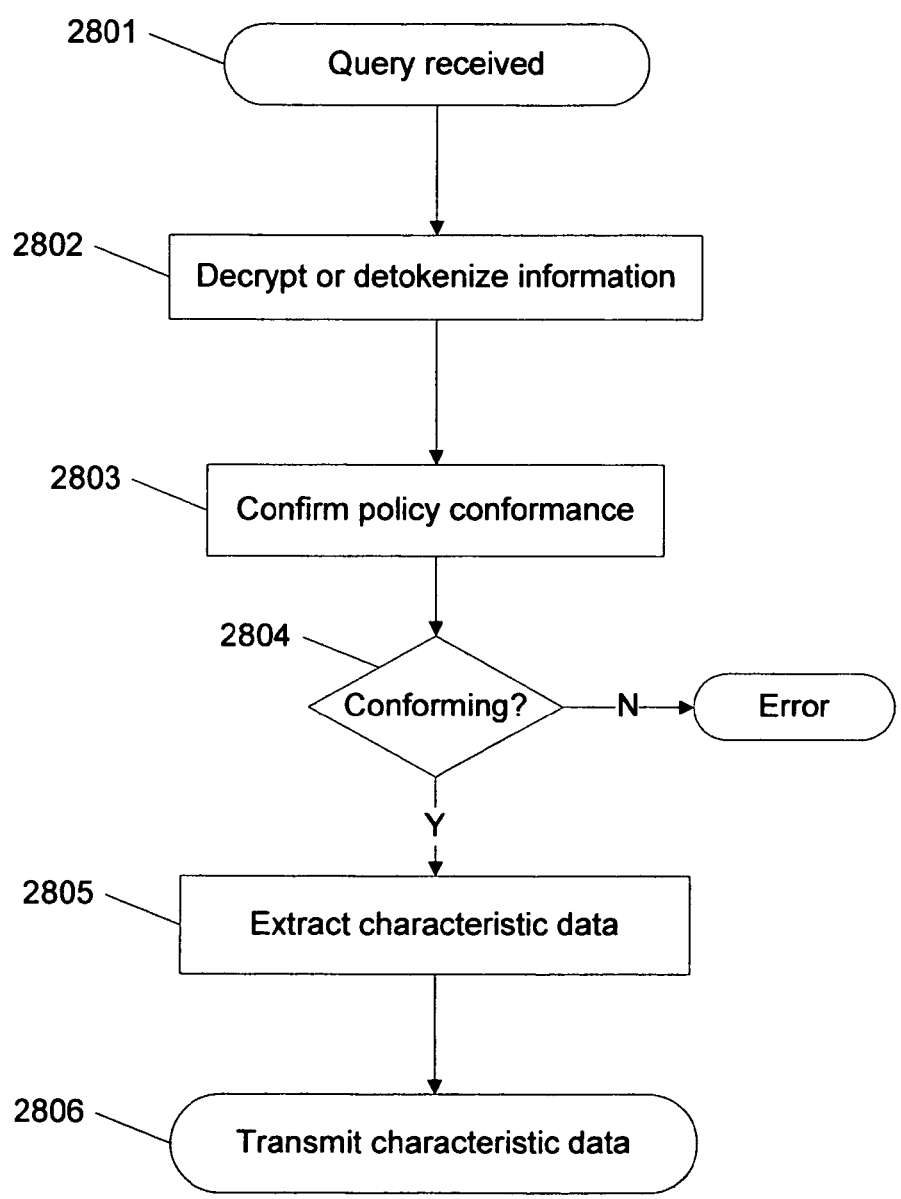
FIG. 28 is a flow diagram of a method for providing characteristic data from encrypted or tokenized information, according to some embodiments.

FIG. 28 is a flow diagram of a method for providing characteristic data from encrypted or tokenized information, according to some embodiments. In this example, a query may be received requesting characteristic data from encrypted or tokenized information (2801). An example of receiving a query is to receive it over a network such as the internet, an intranet or extranet, or a private network. In some embodiments, this request may be part of the technique discussed in conjunction with FIG. 27. The information may be decrypted or detokenized (2802). One example of decrypting information is to decrypt it with a private key corresponding to the public key with which the information was encrypted. Another example of decrypting information is to decrypt it with the secret key with which it was encrypted. An example of detokenizing information is discussed in conjunction with FIG. 26.

One or more policies may be extracted from the decrypted or detokenized information and checked to determine whether the request for characteristic information is conformant to the policies (2803). An example of checking to determine whether a request is conformant is to check whether a vendor ID matches a vendor ID of the requesting party. A vendor ID of the party requesting characteristic information may, for example, be determined by an answer to a challenge, a digital certificate such as a certificate used for client authentication in initiating an SSL communications session, or by other techniques known to those skilled in the art. One example of checking whether vendor IDs match is to check whether they are identical. Another example of checking whether vendor IDs match is to check whether they are logically equivalent, or if the vendor ID of the requestor is authorized by the vendor ID extracted from the encrypted information, for example by checking a lookup table.

If the request is determined to be conformant with the policy or policies (2804), then characteristic data is extracted from the decrypted information in this example (2805). In one example, a partial credit card number, such as the last four digits of a credit card number, may be extracted. In another example, a partial social security number, such as the last four digits of a social security number, may be extracted. In yet another example, partial name or address information, such as one or more initials and/or a zip code, may be extracted. Characteristic data may be transmitted (2806). An example of transmitting characteristic data is to transmit it over a network such as the internet, an intranet or extranet, or a private network, for example using a connection such as a TCP/IP connection, optionally a secure connection such as SSL, which may have been established to transmit the query. In some embodiments, the method of this FIG. 28 may be performed by a data consumer 104 of FIG. 1.

Figure 29:
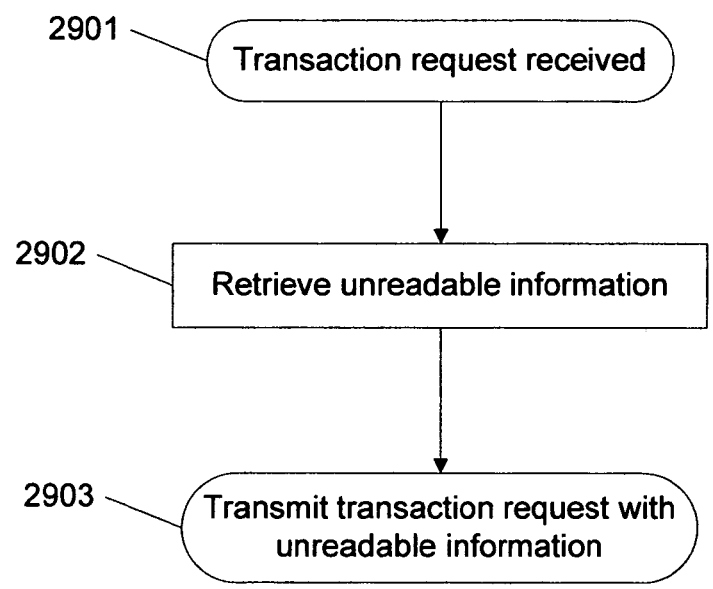
FIG. 29 is a flow diagram of a method for requesting a transaction with unreadable information, according to some embodiments.

FIG. 29 is a flow diagram of a method for requesting a transaction with unreadable information, according to some embodiments. In this example, a transaction request may be received (2901). A transaction request may be any interaction that requires unreadable information. An example of a reason a transaction request may be received is that a user has elected to purchase an item, for example on an online e-commerce site or in a retail store. Another example of a reason a transaction request may be received is that a periodic billing has occurred, for example for a membership or license. Another example of a reason a transaction request may be received is that a service has been rendered for which a charge may be made.

Unreadable information may be retrieved (2902). In some embodiments, unreadable information may have been generated and stored as described in conjunction with FIGS. 24, 25, 26 and/or 27. In some embodiments, unreadable information may be retrieved from the transaction request itself or from a related exchange of information, for example in embodiments in which a trusted path is used to encrypt information at the time a transaction is requested. In other embodiments, unreadable information may be retrieved from customer account information, for example using a database such as a relational database.

A transaction request and associated unreadable information may be transmitted (2903). An example of transmitting a transaction request and associated unreadable information is to transmit it over a network such as the internet, an intranet or extranet, or a private network, for example using a connection such as a TCP/IP connection, optionally a secure connection such as SSL. In some embodiments, the transaction request may be made to a party who has a decryption key that can decrypt the unreadable information, for example a credit card company, payment processor or bank.

Figure 30:
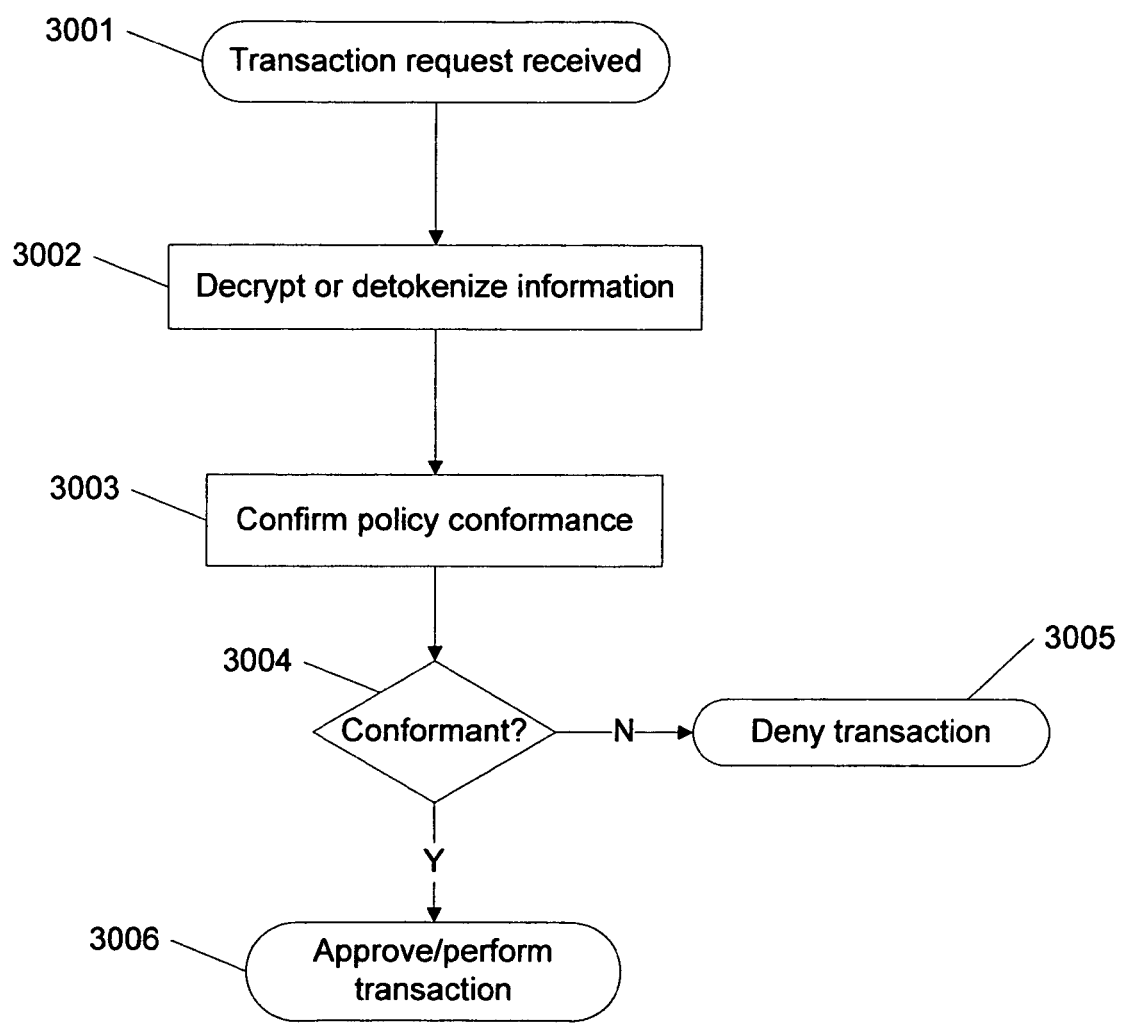
FIG. 30 is a flow diagram of a method for processing a transaction with encrypted or tokenized information, according to some embodiments.

FIG. 30 is a flow diagram of a method for processing a transaction with encrypted or tokenized information, according to some embodiments. In this example, a transaction request including associated encrypted or tokenized information may be received (3001). In some embodiments, a transaction request may have been transmitted as described in conjunction with FIG. 29. An example of receiving a transaction request including associated encrypted information is to receive it over a network such as the internet, an intranet or extranet, or a private network, for example using a connection such as a TCP/IP connection, optionally a secure connection such as SSL.

In some embodiments, encrypted information may be decrypted (3002). One example of decrypting information is to decrypt it with a private key corresponding to the public key with which the information was encrypted. Another example of decrypting information is to decrypt it with the secret key with which it was encrypted. In some embodiments, tokenized information may be detokenized (3002). An example of detokenizing tokenized information is to look up information and one or more associated policies associated with the tokenized information, for example by performing a database query using the token as a key.

One or more policies may be extracted from the decrypted or detokenized information and checked to determine whether the requested transaction conforms to policy (3003). An example of checking to determine whether the request is conformant is to check whether a vendor ID matches a vendor ID of the requesting party. A vendor ID of the requesting party may, for example, be determined by an answer to a challenge, a digital certificate such as a certificate used for client authentication in initiating an SSL communications session, or by other techniques known to those skilled in the art. One example of checking whether vendor IDs match is to check whether they are identical. Another example of checking whether vendor IDs match is to check whether they are logically equivalent, or if the vendor ID of the requestor is authorized by the vendor ID extracted from the encrypted information, for example by checking a lookup table. Another example of checking whether the request is conformant is to compare the date of the request to an expiration date policy. Another example of checking whether the request is conformant is to compare the monetary amount of a transaction with a per-transaction limit policy. Another example of checking whether the request is conformant is to compare the total monetary amount of transactions with an aggregate amount of transactions, optionally within a time period such as a month. Another example of checking whether the request is conformant is to compare an accumulated number of transactions with a policy limiting the number of transactions. Another example of checking whether the request is conformant is to determine whether the encoded information is in a list of invalidated encoded information.

If the requested transaction is not determined to be conformant (3004), then the transaction is denied in this example (3005). For example, the transaction may not be performed, and an error may be returned. In some embodiments, a fraud report may be filed, for example by logging the data available about the requestor and making logged data available to an investigator. If the requested transaction is determined to be conformant (3004), then the transaction is approved or performed in this example (3006). Performing a transaction may be any form of using the provided data. One example of performing a transaction is to charge a credit card or debit a bank account. In some embodiments, a financial credential such as a credit card number, debit card number or bank account number may be included in the decrypted or detokenized information, and may be charged.

Figure 31:
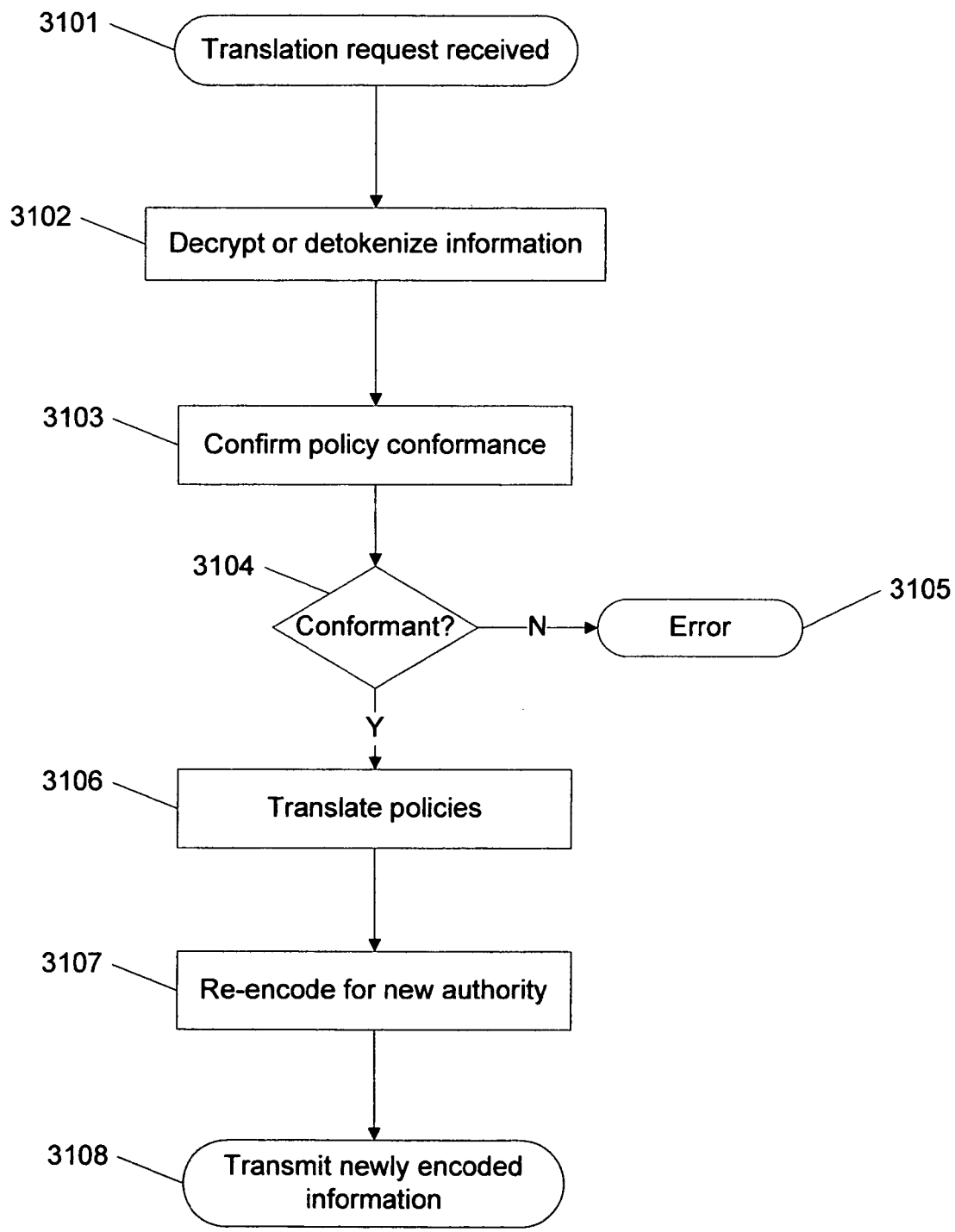
FIG. 31 is a flow diagram of a method for translating unreadable information to a different authority, according to some embodiments.

FIG. 31 is a flow diagram of a method for translating unreadable information to a different authority, according to some embodiments. In this example, a translation request including associated encrypted or tokenized information may be received (3101). An example of receiving a translation request including associated encrypted or tokenized information is to receive it over a network such as the internet, an intranet or extranet, or a private network, for example using a connection such as a TCP/IP connection, optionally a secure connection such as SSL. In some embodiments, encrypted information may be decrypted (3102). One example of decrypting information is to decrypt it with a private key corresponding to the public key with which the information was encrypted. Another example of decrypting information is to decrypt it with the secret key with which it was encrypted. In some embodiments, tokenized information may be detokenized (3102). An example of detokenizing information is to look up information associated with a token, for example in a database such as a relational database in which a table row is keyed by the token.

One or more policies may be extracted from the decrypted or detokenized information and checked to determine whether the request conforms to the policy or policies (3103). An example of checking to determine whether the request is conformant is to check whether a vendor ID matches a vendor ID of the requesting party. A vendor ID of the requesting party may, for example, be determined by an answer to a challenge, a digital certificate such as a certificate used for client authentication in initiating an SSL communications session, or by other techniques known to those skilled in the art. One example of checking whether vendor IDs match is to check whether they are identical. Another example of checking whether vendor IDs match is to check whether they are logically equivalent, or if the vendor ID of the requestor is authorized by the vendor ID extracted from the encrypted information, for example by checking a lookup table. The vendor ID of the requesting party may, for example, be determined by an answer to a challenge, a digital certificate such as a certificate used for client authentication in initiating an SSL communications session, or by other techniques known to those skilled in the art.

If it is not determined that the translation request conforms to policy (3104), then an error is returned in this example (3105). In some embodiments, a fraud report may be filed, for example by logging the data available about the requestor and making logged data available to an investigator. If it is determined that the translation request conforms to policy (3104), then the policy or policies in the decrypted or detokenized information are translated in this example (3106). One example of translating a policy is to change the value of a policy such as a vendor ID to a value included in the translation request. In some embodiments, a value included in the translation request may be validated, for example by verifying with another authority that a vendor ID corresponds to the same entity, for example by confirming that identity information of that entity corresponds. Another example of translating a policy is to subtract an amount already transacted from a limit on the number of transactions or monetary amount allowed. Another example of translating a policy is to invalidate encrypted or tokenized information, for example by adding it to a list of encrypted information or tokens not to accept for transactions. Encrypted or tokenized information may be invalidated, for example, when information containing a limit on the number or value of transactions is transferred to a new authority.

Decrypted or detokenized information with one or more translated policies may be re-encoded for a new authority (3107). One example of re-encoding data is to encrypt it using a public key provided with the translation request or associated with the new authority, which may be referenced in the translation request, for example by name. In this example, the requested authority may be looked up, for example in a database table; and a public key associated with the requested authority may be used to encrypt the information. Another example of re-encoding data is to transmit it to a new authority, who may encrypt the information, for example using a symmetric cipher such as DES, Triple-DES, AES or Blowfish with a secret key, or tokenize the information, for example as discussed in conjunction with FIG. 26. The newly encoded information may be transmitted back to the requestor (3108). An example of transmitting encoded data is to transmit it over a network such as the internet, an intranet or extranet, or a private network, for example using a connection such as a TCP/IP connection, optionally a secure connection such as SSL, which may have been established to request the translation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for security, comprising:
Receiving account information relating to an account;
receiving a policy identifying one or more permitted parties for a financial transaction involving the account information without accessing the account related to the account information;
combining the account information and the policy, wherein combining the account information and policy includes forming the combined information and policy so that a partial characteristic of the account information may be extracted from the combined information and policy;
generating a token to reference the account information using a format that is compatible for use in referencing the account information but not including the account information;
associating the token with the combined information and policy by storing the token with the combined information and policy in a relational database, the token being a key of the relational database;
encrypting the combined information and policy by a public key;
extracting the partial characteristic from the combined information and policy; and providing the extracted partial characteristic in response to a request from a requesting party, the request including the token, wherein the extracted partial characteristic is provided by a transmitter via a data network.

2. The method of claim 1, wherein the policy relates to one or more other transactions different than the financial transaction, and wherein the policy identifies one or more permitted parties for the one or more other transactions.

3. The method of claim 1, wherein the public key is associated with a private key that is not accessible to an encrypting party.

4. The method of claim 1, further comprising providing the combined information and policy in response to a request from a requesting party.

5. The method of claim 4, wherein the combined information and policy is structured so that a determination may be made for whether a given transaction conforms to the policy by determining whether the requesting party matches at least one of the one or more permitted parties.

6. The method of claim 1, wherein the account information and policy are combined by concatenation into a predetermined data format.

7. The method of claim 1, wherein the partial characteristic is a partial credit card number.

8. The method of claim 1, wherein the partial characteristic is a partial social security number.

9. A non-transitory computer-readable medium storing instructions that, when executed by a processor, causes the processor to perform a method comprising:
   Receiving account information relating to an account for the account information;
   receiving a policy identifying one or more permitted parties for a financial transaction involving the account information without accessing the account relating to the account information;
   combining the account information and the policy, wherein combining the account information and policy includes forming the combined information and policy so that a partial characteristic of the information may be extracted from the combined account information and policy;
   generating a token to reference the account information using a format that is compatible for use in referencing the account information, but not including the account information;
   associating the token with the combined information and policy by storing the token with the combined information and policy in a relational database, the token being a key of the relational database;
   encrypting the combined information and policy by a public key;
   extracting the partial characteristic from the combined information and policy; and
   providing the extracted partial characteristic in response to a request from a requesting party, the request including the token, wherein the extracted partial characteristic is provided by a transmitter via a data network.

10. The non-transitory computer-readable medium of claim 9, wherein the policy relates to one or more other transactions different than the financial transaction, and wherein the policy identifies one or more permitted parties for the one or more other transactions.

11. The non-transitory computer-readable medium of claim 9, wherein the public key is associated with a private key that is not accessible to an encrypting party.

12. The non-transitory computer-readable medium of claim 9, further comprising providing the combined information and policy in response to a request from a requesting party.

13. The non-transitory computer-readable medium of claim 12, wherein the combined information and policy is structured so that a determination may be made for whether a given transaction conforms to the policy by determining whether the requesting party matches at least one of the one or more permitted parties.

14. The non-transitory computer-readable medium of claim 9, wherein the account information and policy are combined by concatenation into a predetermined data format.

15. The non-transitory computer-readable medium of claim 9, wherein the partial characteristic is a partial credit card number.

16. The non-transitory computer-readable medium of claim 9, wherein the partial characteristic is a partial social security number.

17. A method for encryption, comprising:
   receiving account information relating to an account;
   receiving a policy identifying one or more permitted parties for a financial transaction involving the account information without accessing the account relating to the account information;
   combining the account information and the policy, wherein combining the account information and policy includes forming the combined information and policy so that a partial characteristic of the account information may be extracted from the combined information and policy;
   generating a token to reference the account information using a format that is compatible for use in referencing the account information, but not including the account information;
   associating the token with the combined information and policy by storing the token with the combined information and policy in a relational database, the token being a key of the relational database;
   providing the combined information and policy as unreadably encoded data;
   extracting the partial characteristic from the combined information and policy; and
   providing the extracted partial characteristic in response to a request from a requesting party, the request including the token, wherein the extracted partial characteristic is provided by a transmitter via a data network.

18. The method of claim 17, wherein the token refers to the information and/or the policy without literally containing the information and/or the policy.

19. The method of claim 17, further comprising extracting the partial characteristic of the information from the combined information and policy.

20. The method of claim 17, wherein the partial characteristic is a partial credit card number.

* * * * *